(12) United States Patent
Sone et al.

(10) Patent No.: US 9,172,092 B2
(45) Date of Patent: Oct. 27, 2015

(54) BINDER COMPOSITION FOR BATTERIES, SLURRY FOR BATTERY ELECTRODES, SOLID ELECTROLYTE COMPOSITION, ELECTRODE, AND ALL-SOLID-STATE BATTERY

(75) Inventors: Takuo Sone, Tokyo (JP); Tsukasa Toyoshima, Tokyo (JP)

(73) Assignee: JSR CORPORATION, Tokyo (JP)

( * ) Notice: Subject to any disclaimer, the term of this patent is extended or adjusted under 35 U.S.C. 154(b) by 226 days.

(21) Appl. No.: 13/990,213

(22) PCT Filed: Nov. 11, 2011

(86) PCT No.: PCT/JP2011/076119
§ 371 (c)(1),
(2), (4) Date: May 29, 2013

(87) PCT Pub. No.: WO2012/073678
PCT Pub. Date: Jun. 7, 2012

(65) Prior Publication Data
US 2013/0260241 A1   Oct. 3, 2013

(30) Foreign Application Priority Data

Nov. 29, 2010   (JP) .................................. 2010-265798

(51) Int. Cl.
*H01M 4/62*     (2006.01)
*H01M 10/0562*  (2010.01)

(52) U.S. Cl.
CPC .......... *H01M 4/622* (2013.01); *H01M 10/0562* (2013.01); *H01M 2300/0082* (2013.01)

(58) Field of Classification Search
USPC ............... 524/571–575, 575.5, 555, 556, 588
See application file for complete search history.

(56) References Cited

U.S. PATENT DOCUMENTS

| | | | |
|---|---|---|---|
| 3,431,323 A | 3/1969 | Jones | |
| 5,378,560 A | 1/1995 | Tomiyama | |
| 6,200,707 B1 | 3/2001 | Takada et al. | |
| 6,368,746 B1 | 4/2002 | Takada et al. | |
| 7,718,728 B2* | 5/2010 | Mikami et al. | 524/555 |
| 7,807,747 B2* | 10/2010 | Oshima | 524/588 |
| 8,071,682 B2* | 12/2011 | Maeda et al. | 525/102 |
| 2004/0254301 A1* | 12/2004 | Tsukimawashi et al. | 525/271 |

FOREIGN PATENT DOCUMENTS

| | | |
|---|---|---|
| JP | 43 19960 | 8/1968 |
| JP | 47 40473 | 10/1972 |
| JP | 59 133203 | 7/1984 |
| JP | 62 218403 | 9/1987 |
| JP | 63 5401 | 2/1988 |
| JP | 1 275605 | 11/1989 |
| JP | 5 222115 | 8/1993 |
| JP | 5 271325 | 10/1993 |
| JP | 5 271326 | 10/1993 |
| JP | 7 37619 | 2/1995 |
| JP | 7 90017 | 4/1995 |
| JP | 7 230810 | 8/1995 |
| JP | 9 63590 | 3/1997 |
| JP | 10 3943 | 1/1998 |
| JP | 10 279608 | 10/1998 |
| JP | 11 21455 | 1/1999 |
| JP | 11 86899 | 3/1999 |
| JP | 11 102709 | 4/1999 |
| JP | 11 292924 | 10/1999 |
| JP | 2000 37632 | 2/2000 |
| JP | 2000 123874 | 4/2000 |
| JP | 2000 200608 | 7/2000 |
| JP | 2000 256616 | 9/2000 |
| JP | 2004 63300 | 2/2004 |
| JP | 2004 220911 | 8/2004 |
| JP | 2007 87881 | 4/2007 |
| JP | 2007 134305 | 5/2007 |
| JP | 2009 80999 | 4/2009 |
| JP | 2011 54445 | 3/2011 |
| TW | 200832778 | 8/2008 |
| TW | 200948919 A1 | 12/2009 |
| WO | 99 08335 | 2/1999 |

OTHER PUBLICATIONS

International Search Report Issued Feb. 21, 2012 in PCT/JP11/76119 Filed Nov. 11, 2011.

Japanese Office Action Issued Jul. 24, 2012 in JP Patent Application No. 2012 517607 (with English translation).
Combined Taiwanese Office Action and Search Report issued Mar. 4, 2015 in Patent Application No. 100143577 (with English Translation).

* cited by examiner

*Primary Examiner* — Vu A Nguyen
(74) *Attorney, Agent, or Firm* — Oblon, McClelland, Maier & Neustadt, L.L.P.

(57) ABSTRACT

A binder composition for batteries, including (A) a polymer that has at least one structural unit selected from the group consisting of structural units represented by the following formulae (a1) to (a5), respectively, and (f) a functional group containing a nitrogen atom, an oxygen atom, a silicon atom, a germanium atom, a tin atom or a combination thereof; and (B) a liquid medium, the polymer (A) having a solubility of no less than 5 g in 100 g of cyclohexane at 25° C. and 1 atom.

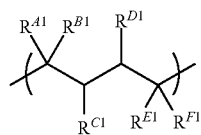

(a1)

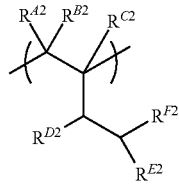

(a2)

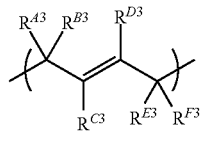

(a3)

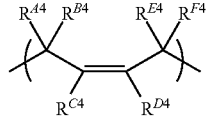

(a4)

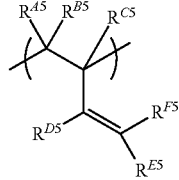

(a5)

13 Claims, 1 Drawing Sheet

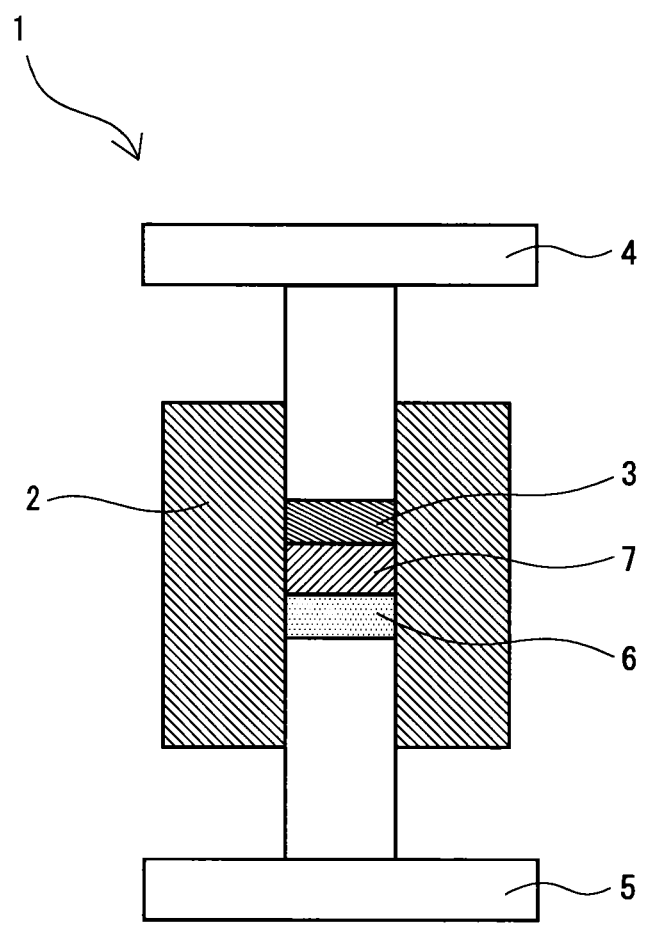

BINDER COMPOSITION FOR BATTERIES, SLURRY FOR BATTERY ELECTRODES, SOLID ELECTROLYTE COMPOSITION, ELECTRODE, AND ALL-SOLID-STATE BATTERY

TECHNICAL FIELD

The present invention relates to a binder composition for batteries, a slurry for battery electrodes, a solid electrolyte composition, an electrode, and an all-solid-state battery.

BACKGROUND ART

Electrochemical elements, including batteries, are constructed from an electrolyte where ion migration occurs and an electrode where electrons are donated to migrated ions. In a case in which the electrolyte is a liquid where a support salt is dissolved in a solvent, it is difficult to make the electrochemical element smaller or thinner since a container for housing the liquid is necessary. The electrochemical elements, particularly lithium batteries, have been vigorously investigated in order to achieve a battery with a higher energy density on the basis that lithium is a substance with a small atomic weight and a large ionization energy, and nowadays have been widely used for electric current sources of portable instruments. On the other hand, internal energy thereof has increased due to increase of content of active materials, and also content of flammable organic solvents in electrolyte liquids has increased; therefore, in recent years, the lithium batteries have been closed up in terms of safety thereof along with being universally applied. Nowadays, development of all-solid-state batteries has been carried out in which a solid electrolyte material of nonflammable substance is used from the viewpoints of small-sizing, thin-sizing, and safety thereof.

An electrode used for the all-solid-state batteries is produced through steps of coating and drying a slurry for battery electrodes that contains an electrode active material and a binder composition for batteries dissolving a polymer in an organic liquid medium on a surface of a current collector, and laminating an electrode layer on the current collector by press-working the resulting coating, for example.

In the all-solid-state batteries, not only adhesion to the current collector but also high adhesion to a solid electrolyte layer disposed between a pair of electrodes is required to the electrode layer formed from the slurry for battery electrodes. In addition, in order to improve electrical conductivity of the solid electrolyte layer, suppression of an amount of binder used in relation to the solid electrolyte material in the solid electrolyte layer is also required, and thus improvement of the adhesion is further required. For the purpose of improving the adhesion, employment of a polymer with a relatively high polarity as the binder has been investigated (see Patent Documents 1 to 8). In order to dissolve such a polymer, a highly-polar organic liquid medium such as N-methylpyrrolidone must be used.

However, such a highly-polar organic liquid medium deteriorates or degrades an electrode active material, as a result, there arises a problem in that electric performance of electrodes or batteries using them are impaired. On the other hand, in cases of using a nonpolar organic liquid medium dispersing a polymer with less influence on the electrode active material, it is difficult to form a uniform electrode layer when coating the slurry for battery electrodes on a surface of the current collector by a process such as a doctor blade process and a spin coating process in particular, and thus workability is poor when producing electrodes.

For the countermeasure, in order to avoid the problems described above, a low-polar polymer soluble in a nonpolar or low-polar organic liquid medium has been investigated for the purpose of employing as a polymer for forming a binder so as to variously improve a structure etc. of the polymer and to enhance the adhesion etc. (see Patent Documents 8 to 11); however, improvement of the adhesion is not so remarkable in the technology until now.

PRIOR ART DOCUMENTS

Patent Documents

Patent Document 1: Japanese Unexamined Patent Application, Publication No. 2000-256616
Patent Document 2: Japanese Unexamined Patent Application, Publication No. 2000-200608
Patent Document 3: PCT International Publication No. 99/8335
Patent Document 4: Japanese Unexamined Patent Application, Publication No. H11-21455
Patent Document 5: Japanese Unexamined Patent Application, Publication No. H11-102709
Patent Document 6: Japanese Unexamined Patent Application, Publication No. H10-279608
Patent Document 7: Japanese Unexamined Patent Application, Publication No. H10-3943
Patent Document 8: Japanese Unexamined Patent Application, Publication No. H9-63590
Patent Document 9: Japanese Unexamined Patent Application, Publication No. 2009-80999
Patent Document 10: Japanese Unexamined Patent Application, Publication No. 2000-123874
Patent Document 11: Japanese Unexamined Patent Application, Publication No. H11-86899

SUMMARY OF THE INVENTION

Problems to be Solved by the Invention

The present invention has been made in consideration of the circumstances described above; it is an object of the embodiment of the present invention to provide a binder composition for batteries that exhibits excellent adhesion to solid electrolyte materials and current collectors and allows to form electrodes etc. excellent in electric characteristics along with allowing to enhance workability in electrode production, and also a slurry for battery electrodes, a solid electrolyte composition, an electrode, and an all-solid-state battery that contain the binder composition for batteries.

Means for Solving the Problems

A binder composition for batteries according to one embodiment of the invention made for solving the above-mentioned problems includes:

(A) a polymer that has at least one structural unit selected from structural units represented by the following formulae (a1) to (a5), respectively, and (f) a functional group containing a nitrogen atom, an oxygen atom, a silicon atom, a germanium atom, a tin atom or a combination thereof; and (B) a liquid medium, the polymer (A) having a solubility of no less than 5 g in 100 g of cyclohexane at 25° C. and 1 atom

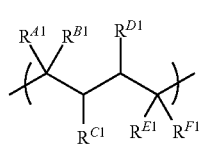

(a1)

-continued

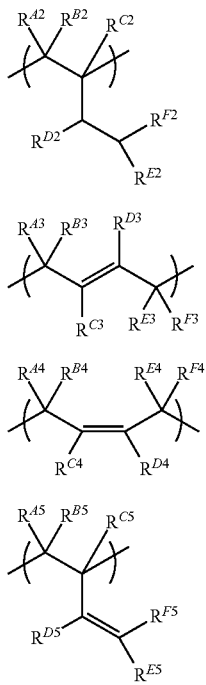

(a2)

(a3)

(a4)

(a5)

wherein, in the formulae (a1) to (a5), $R^{A1}$ to $R^{F5}$ are each independently a hydrogen atom or a monovalent aliphatic hydrocarbon group having 1 to 18 carbon atoms.

The binder composition for batteries of the embodiment of the present invention is excellent in adhesion to solid electrolyte materials and current collectors by virtue of containing the polymer (A) having the particular structural unit and the particular functional group (f). Accordingly, the binder composition for batteries is suited for forming battery components such as electrode layers, electrodes consisting of electrode layers and current collectors, and solid electrolyte layers, for example. Furthermore, since the binder composition for batteries exhibits a solubility of the polymer (A) in cyclohexane of no less than a predetermined value, a nonpolar or low-polar organic liquid medium can be used. Accordingly, in the binder composition for batteries, binder amount can be reduced and degradation of electrode active materials can be suppressed, thereby electrodes etc. excellent in electric characteristics can be produced.

Preferably, the polymer (A) is obtained by reacting an active end of a polymer having at least one structural unit selected from the structural units represented by the formulae (a1) to (a5), respectively, with (m) a denaturant containing a nitrogen atom, an oxygen atom, a silicon atom, a germanium atom, a tin atom or a combination thereof to form a bond.

The polymer (A) can be conveniently obtained by the above-mentioned reaction.

Preferably, the denaturant (m) is represented by the formula (x) below:

$$R^1{}_{4-n1}MX^1{}_{n1} \qquad (x)$$

wherein, in the formula (x), $R^1$ is a hydrogen atom or a monovalent hydrocarbon group; M is a silicon atom, a germanium atom, or a tin atom; $X^1$ is a halogen atom or an alkoxy group; n1 is an integer of from 2 to 4; and wherein, in a case in which $R^1$ is preset in a plurality of number, the plurality of $R^1$s are each identical or different, and in a case in which $X^1$ is preset in a plurality of number, the plurality of $X^1$s are each identical or different.

By defining the denaturant (m) to the above-mentioned particular denaturant, the polymer (A) having a silicon atom, a germanium atom, or a tin atom as the functional group (f) can be conveniently obtained.

Preferably, the polymer (A) is represented by the formula (P) below:

$$L_aMY_{4-a} \qquad (P)$$

wherein, in the formula (P), L is a polymer chain having at least one structural unit selected from the structural units represented by the above formulae (a1) to (a5), respectively; M is a silicon atom, a germanium atom, or a tin atom; Y is a hydrogen atom, a monovalent hydrocarbon group, a halogen atom, or an alkoxy group; a is an integer of from 2 to 4; and wherein, in a case in which L is preset in a plurality of number, the plurality of Ls are each identical or different, and in a case in which Y is preset in a plurality of number, the plurality of Ys are each identical or different.

When the polymer (A) is defined by the above-mentioned particular structures, the polymer can have various structures and thus can provide the binder composition for batteries with various properties.

Preferably, the polymer (A) has at least one structural unit selected from the structural units represented by the formulae (a1) and (a2), respectively, and the total content of the structural units represented by the formulae (a1) and (a2) is no less than 60% by mol with respect to the total content of the structural units represented by the formulae (a1) to (a5). In the binder composition for batteries, adhesion of the resulting binder can be further improved by limiting the content of double bond in the polymer (A) to less than a predetermined value. Furthermore, degradation of the polymer (A) by action of electrode active materials can be suppressed in electrodes etc. resulting from the binder composition for batteries, thus durability of electrodes etc. can be improved.

Preferably, the content of the functional group (f) in the polymer (A) is no less than 0.0005 and no greater than 0.2 mol/kg. By limiting the content of the functional group (f) in the polymer (A) to this particular range, both of adhesion to solid electrolyte materials and solubility in nonpolar organic liquid media can be compatible at a high level.

Preferably, the functional group (f) of the polymer (A) is an amino group, a hydroxyl group, a carboxyl group, an alkoxysilyl group or a combination thereof. When the particular group is employed as the functional group (f) in the binder composition for batteries, improvement of adhesion to solid electrolyte materials of the resulting binder as well as improvement of workability during production of electrode layers by virtue of higher solubility in nonpolar organic liquid media can be compatible at a still higher level.

Preferably, the ratio of a weight average molecular weight to a number average molecular weight of the polymer (A) is no greater than 3. In the binder composition of batteries, adhesion of the resulting binder can be further improved by use of the polymer (A) with a narrower molecular weight distribution. In addition, a minute amount of insoluble matters in nonpolar organic liquid media can be suppressed, thus uniformity of resulting electrode layers can be enhanced and workability and performance of resulting electrodes etc. can be further improved.

Preferably, the polymer (A) is obtained by living anionic polymerization. When the polymer (A) is obtained by the living anionic polymerization, the molecular weight distribution can be made still narrower, thus adhesion of the binder can be further improved. Furthermore, when the living anionic polymerization is used, the functional group (f) can be introduced into the polymer by a simple process.

It is preferred in the binder composition of batteries that the liquid medium (B) is a nonpolar organic liquid medium. When the liquid medium (B) as a medium for dissolving the polymer (A) is a nonpolar organic liquid medium in the binder composition of batteries, workability for making the binder composition into a liquid can be further improved.

Accordingly, the binder composition of batteries can result in a binder having high adhesion to not only solid electrolyte materials but also current collectors of electrodes, and an amount of the binder used can be reduced and electrical conductivity of solid electrolyte layers can be improved, therefore, the binder composition of batteries can be favorably used for all-solid-state batteries.

A slurry for battery electrodes according to another embodiment of the present invention contains an electrode active material and the binder composition of batteries. Since the slurry for battery electrodes contains the binder composition of batteries having the above-mentioned properties, storage stability thereof can be excellent because the electrode active material can be far from deterioration etc.; consequently, performance of electrodes or batteries formed from the slurry for battery electrodes can be improved. Furthermore, the slurry for battery electrodes allows to form uniform electrode layers, thus workability is excellent when producing electrodes.

A solid electrolyte composition according to still another embodiment of the present invention contains a solid electrolyte material and the binder composition of batteries. As described above, the binder composition of batteries allows to form a binder having high adhesion to solid electrolyte materials, thus the solid electrolyte composition containing it allows to form highly durable solid electrolyte layers. Furthermore, the solid electrolyte composition allows to reduce an amount of the binder for solid electrolyte materials in solid electrolyte layers, thus solid electrolyte layers with high electrical conductivity can be formed.

An electrode according to yet another embodiment of the present invention is equipped with a current collector and an electrode layer laminated on at least a part of the current collector, in which the electrode layer is formed from the slurry for battery electrodes. In the electrode, the electrode layer laminated on the current collector is formed from the slurry for battery electrodes having the above-mentioned properties. That is, the current collector and electrode active materials etc. are strongly bound by the binder, thus durability thereof is excellent. Furthermore, as described above, the amount of the binder can be reduced and also electrode active materials resistant to deterioration or degradation can be used, thus the electrode is excellent in electric characteristics.

An all-solid-state battery according to other embodiment of the present invention is equipped with a pair of electrodes disposed such that electrode layers are opposed, and a solid electrolyte layer disposed between the pair of electrodes. Since the all-solid-state battery is equipped with the electrodes and the solid electrolyte layer having the above-mentioned properties, durability thereof is excellent and also the solid electrolyte layer is excellent in electric characteristics such as electrical conductivity.

Herein, an "organic group" indicates a group containing at least one carbon atom.

Effects of the Invention

As described above, the binder composition for batteries of the embodiment of the present invention allows to form electrodes etc. that are excellent in adhesion to solid electrolyte materials and current collectors as well as excellent in electric characteristics while allowing to enhance workability in electrode production.

BRIEF DESCRIPTION OF THE DRAWINGS

FIG. 1 is a schematic view showing a configuration of a device for measuring electric characteristics used in Examples.

DESCRIPTION OF EMBODIMENTS

The present invention is explained with respect to embodiments thereof below.

Binder Composition for Batteries

The binder composition for batteries of the embodiment of the present invention contains (A) a polymer and (B) a liquid medium. The binder composition for batteries may further contain optional components within a range not leading to impairment of the effects of the embodiment of the present invention.

Polymer (A)

The polymer (A) used in the binder composition for batteries has at least one structural unit selected from the group consisting of structural units represented by the above formulae (a1) to (a5), respectively, and (f) a functional group that contains a nitrogen atom, an oxygen atom, or a silicon atom, and has a solubility of no less than 5 g in 100 g of cyclohexane at 25° C. and 1 atom.

Structural Units (a1) to (a5)

The polymer (A) has at least one structural unit selected from the group consisting of structural units represented by the above formulae (a1) to (a5), respectively.

In the formulae (a1) to (a5), $R^{A1}$ to $R^{F5}$ are each independently a hydrogen atom or a monovalent aliphatic hydrocarbon group having 1 to 18 carbon atoms.

The monovalent aliphatic hydrocarbon group having 1 to 18 carbon atoms may be exemplified by alkyl groups having 1 to 18 carbon atoms, alkenyl groups having 2 to 18 carbon atoms, alkynyl groups having 2 to 18 carbon atoms, cycloalkyl groups having 3 to 18 carbon atoms, cycloalkenyl groups having 3 to 18 carbon atoms, and cycloalkynyl groups having 6 to 18 carbon atoms.

The alkyl group having 1 to 18 carbon atoms may be exemplified by a methyl group, an ethyl group, a linear or branched propyl group, a butyl group, a pentyl group, a hexyl group, a heptyl group, an octyl group, a nonyl group, a decyl group, a dodecyl group, a tetradecyl group, a hexadecyl group, and the like.

The alkenyl group having 2 to 18 carbon atoms may be exemplified by an ethenyl group, a linear or branched propenyl group, a butenyl group, a pentenyl group, a hexenyl group, a heptenyl group, an octenyl group, a nonenyl group, a decenyl group, a dodecenyl group, a tetradecenyl group, a hexadecenyl group, and the like.

The alkenyl group having 2 to 18 carbon atoms may be exemplified by an ethynyl group, a linear or branched propynyl group, a butynyl group, a pentynyl group, a hexynyl group, a heptynyl group, an octynyl group, a nonynyl group, a decynyl group, a dodecynyl group, a tetradecynyl group, a hexadecynyl group, and the like.

The cycloalkyl group having 3 to 18 carbon atoms may be exemplified by monocyclic groups such as a cyclopropyl group, a cyclobutyl group, a cyclopentyl group, a cyclohexyl group, a cycloheptyl group, a cyclooctyl group, a cyclodecyl group and a cyclododecyl group; polycyclic groups such as a dicyclopentyl group, a dicyclohexyl group, a norbornyl group, an adamantyl group, a tricyclodecyl group and a tetracyclododecyl group, and the like.

The cycloalkenyl groups having 3 to 18 carbon atoms may be exemplified by monocyclic groups such as a cyclopropenyl group, a cyclobutenyl group, a cyclopentenyl group, a cyclohexenyl group, a cycloheptyl group, a cyclooctenyl group, a cyclodecenyl group and a cyclododecenyl group; polycyclic groups such as a dicyclopentenyl group, a dicyclohexenyl group, a norbornenyl group, a tricyclodecenyl group and a tetracyclododecanyl group, and the like.

The cycloalkynyl groups having 8 to 18 carbon atoms may be exemplified by monocyclic groups such as a cyclooctynyl group and a cyclodecynyl group and a polycyclic groups such as a tetracyclododecynyl group.

From the viewpoint of improvement in durability of the resulting binder, among these groups, hydrogen atom or alkyl groups having 1 to 10 carbon atoms are preferred, a hydrogen atom, a methyl group, an ethyl group and a butyl group are more preferred, a hydrogen atom and a methyl group are still more preferred, and hydrogen atom is particularly preferred.

A monomer to provide the above-mentioned structural unit may be exemplified by linear or branched compounds having an aliphatic conjugated double bond. Specific examples thereof are 1,3-butadiene, isoprene, 2,3-dimethyl-1,3-butadiene, 2-chloro-1,3-butadiene, 1,3-pentanediene, and the like; and these may be used alone or in a combination of two or more. Among these, butadiene and isoprene are preferred, and butadiene is preferably 3-butadiene in particular. A structural unit to provide the structural units (a1) and (a2) may be exemplified by linear or branched compounds having an aliphatic independent double bond. Specific examples thereof are propylene, 1-butene, 2-butene, 1-pentene, 2-pentene, 4-methylpentene, 1-hexene, 1-octene, and the like; and these may be used alone or in a combination of two or more.

All of the structural units (a1) to (a5) in the polymer (A) are preferably derived from 1,3-butadiene and/or isoprene and more preferably derived from 1,3-butadiene.

The polymer (A) may contain a structural unit other than the structural units from (a1) to (a5) as long as its solubility falls within the above-mentioned range. A monomer to provide such other structural units may be exemplified by aromatic vinyl compounds; specific examples thereof are styrene, t-butyl styrene, α-methyl styrene, p-methyl styrene, p-ethyl styrene, divinyl benzene, 1,1-diphenyl styrene, vinylnaphthalene, and the like. Among these, styrene is preferred. In regards to the content of structural units derived from aromatic vinyl compounds, the total content of structural units derived from aromatic vinyl compounds in the polymer (A) is preferably less than 50% by mol, more preferably less than 30% by mol, still more preferably less than 10% by mol, and particularly preferably 0% by mol, i.e. without structural units derived from aromatic vinyl compounds. When the content of structural units derived from the aromatic vinyl compounds falls within this range, hardness of the polymer (A) becomes adequate and adhesion of the binder may be improved. Furthermore, oxidative resistance of the polymer (A) is improved and thus durability of the binder is improved. Still further, flexibility of electrode layers formed from the binder composition for batteries is improved, thus durability of electrode layers is improved. The above-mentioned aromatic vinyl compounds may be used alone or in a combination of two or more.

In addition to the aromatic vinyl compounds, (meth)acrylic acid esters such as methyl (meth)acrylate, ethyl (meth)acrylate, and hydroxyethyl (meth)acrylate; and acrylonitrile may be used as the monomer to provide another structural unit in the polymer (A), for example.

In regards to the content of other structural units, the total content of other structural units in the polymer (A) is preferably less than 40% by mol, more preferably less than 20% by mol, and still more preferably less than 10% by mol.

The content of 1,2-vinyl bond in the polymer (A), i.e. the ratio of total amount of the structural units (a2) and (a5) versus total amount of the structural units from (a1) to (a5) in the polymer (A) is preferably 80% by mol or less, more preferably from 10% to 75% by mol, and particularly preferably from 10% to 70% by mol. When the content of 1,2-vinyl bond falls within this range, adhesion of the resulting binder may be improved. Here, the content of 1,2-vinyl bond in the polymer (A) can be determined by a Hampton method based on infrared spectroscopic measurement.

When the polymer (A) has the structural unit (a1) and/or (a2), the ratio of total content of the structural units (a1) and (a2) versus total content of the structural units from (a1) to (a5), i.e. a hydrogenation rate of double bond when synthesizing the polymer (A) from conjugated diene compounds etc., is preferably no less than 60% by mol, more preferably no less than 70% by mol, and particularly preferably no less than 80% by mol. When the ratio of the structural units (a1) and (a2) falls within this range, adhesion of the resulting binder may be improved. Here, the ratio of content of the structural units may be measured by proton nuclear magnetic resonance spectrometry ($^1$H-NMR).

Functional Group (f)

The polymer (A) has the functional group (f) containing a nitrogen atom, an oxygen atom, a silicon atom, a germanium atom, a tin atom or a combination thereof (hereinafter, also referred to as "particular atom"). When the polymer (A) has the functional group (f), the binder formed from the binder composition for batteries may exert excellent adhesion to current collectors, solid electrolyte materials, and the like.

The functional group (f) is not particularly limited thereto as long as it contains a nitrogen atom, an oxygen atom, a silicon atom, a germanium atom, a tin atom or a combination thereof.

Specific examples of the functional group (f) are shown below. The functional group (f) having two or more atoms among nitrogen atom, oxygen atom, silicon atom, germanium atom, and tin atom are exemplified only by a functional group containing one atom among them.

Specific examples of the functional group containing a nitrogen atom are amino groups such as unsubstituted amino groups, monoalkylamino groups, monoarylamino groups, dialkylamino groups, diarylamino groups, alkylarylamino groups, cyclic amino groups, and bis(trialkylsilyl)amino groups; cyano groups, aminocarbonyl groups, alkylaminocarbonyl groups, arylaminocarbonyl groups, imino groups, pyridyl groups, imidazolyl groups, and the like. Among these, amino groups are preferred in view of adhesion of the resulting binder; in particular, unsubstituted amino groups, monoalkylamino groups, dialkylamino groups, cyclic amino groups, and bis(trialkylsilyl)amino groups are more preferred; unsubstituted amino groups, dimethylamino groups, and cyclic amino groups are still more preferred; and unsubstituted amino groups, dimethylamino groups, and N-piperidinyl groups are particularly preferred.

Specific examples of the functional group containing an oxygen atom are hydroxyl groups, epoxy groups, carboxyl groups, ether groups, alkoxy groups, aryloxy groups, carbonyl groups, alkoxy carbonyl groups, aryloxy carbonyl groups, acid anhydride groups, and lactone groups. Among these, hydroxyl groups, epoxy groups, carboxyl groups, and acid anhydride groups are preferred in view of adhesion of the resulting binder; and hydroxyl groups and carboxyl groups are more preferred.

Specific examples of the functional group containing a silicon atom are unsubstituted silyl groups, alkoxysilyl groups such as alkoxysilyl groups, dialkoxysilyl groups, and trialkoxysilyl groups; and aryloxysilyl groups such as aryloxysilyl groups, diaryloxysilyl groups, and triaryloxysilyl groups. Among these, alkoxysilyl groups are preferred in view of adhesion of the resulting binder; monoalkoxysilyl groups, dialkoxysilyl groups, and trialkoxysilyl groups are more preferred; in particular, monomethoxysilyl groups, monoethoxysilyl groups, dimethoxysilyl groups, diethoxysilyl groups, trimethoxysilyl groups, and triethoxysilyl groups are still more preferred.

Specific examples of the functional group containing a germanium atom are unsubstituted germyl groups, alkoxygermyl groups such as alkoxygermyl groups, dialkoxygermyl groups, and trialkoxygermyl groups; and aryloxygermyl groups such as aryloxygermyl groups, diaryloxygermyl groups, and triaryloxygermyl groups. Among these, alkoxygermyl groups are preferred in view of adhesion of the resulting binder; monoalkoxygermyl groups, dialkoxygermyl groups, and trialkoxygermyl groups are more preferred; in particular, monomethoxygermyl groups, monoethoxygermyl groups, dimethoxygermyl groups, diethoxygermyl groups, trimethoxygermyl groups, and triethoxygermyl groups are still more preferred.

Specific examples of the functional group containing a tin atom are unsubstituted stannyl groups, alkoxystannyl groups such as alkoxystannyl groups, dialkoxystannyl groups, and trialkoxystannyl groups; and aryloxystannyl groups such as aryloxystannyl groups, diaryloxystannyl groups, and triaryloxystannyl groups. Among these, alkoxystannyl groups are preferred in view of adhesion of the resulting binder; monoalkoxystannyl groups, dialkoxystannyl groups, and trialkoxystannyl groups are more preferred; in particular, monomethoxystannyl groups, monoethoxystannyl groups, dimethoxystannyl groups, diethoxystannyl groups, trimethoxystannyl groups, and triethoxystannyl groups are still more preferred.

The method to introduce the functional group (f) into the polymer is not particularly limited and a conventional method may be employed. For example, (i) a method of reacting a denaturant (m) containing a particular atom with an active end of a polymer after polymerization reaction to form a bond, (ii) a method of carrying out a polymerization reaction using a polymerization initiator containing a particular atom (hereinafter, also referred to as "polymerization initiator (m)"), (iii) a method of copolymerizing a monomer containing a particular atom (hereinafter, also referred to as "monomer (m)"), (iv) a method of reacting a compound containing a particular atom (hereinafter, also referred to as "compound (m)") with a part of the polymer, and the like. The denaturant (m), the polymerization initiator (m), the monomer (m), and the compound (m) containing a particular atom have the functional group (f) or a group that can be converted to the functional group (f).

Preferably, the denaturant (m) and the compound (m) used may be selected from the group consisting of the compounds represented by the formulae (z1) to (z4) below.

(z1)

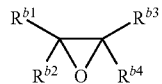

(z2)

(z3)

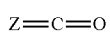

(z4)

In the formulae (z1) to (z4), $R^a$, $R^{b1}$ to $R^{b4}$, $R^{c1}$, and $R^{c2}$ are each independently a hydrogen atom or a monovalent organic group; here, $R^{b1}$ and $R^{b3}$ or $R^{c1}$ and $R^{c2}$ may bond each other to form a ring structure together with the carbon atom to which they bond; $X^a$ is a halogen atom or an alkoxy group; Z is an oxygen atom or NR'; R' is a monovalent organic group; k is an integer from 2 to 4; wherein, in a case in which $R^a$ is preset in a plurality of number, the plurality of $R^a$s are each identical or different, and in a case in which $X^a$ is preset in a plurality of number, the plurality of $X^a$s are each identical or different.

The denaturant (m) in the above-mentioned method (i) may be exemplified by silane compounds, germane compounds, stannane compounds, aldehyde compounds, ketone compounds, amide compounds, isocyanate compounds, epoxide compounds, carbon dioxide, and the like. As the denaturant (m), these compounds may be used either alone or two or more thereof.

The silane compound used may be the compounds represented by the above formula (z1); examples thereof include alkoxysilane compounds such as monoalkoxysilane compounds, dialkoxysilane compounds, trialkoxysilane compounds, and tetraalkoxysilane compounds; monohalogenated silicon compounds, dihalogenated silicon compounds, trihalogenated silicon compounds, and tetrahalogenated silicon compounds, and the like.

The silane compound for introducing a halogen atom may be exemplified by silane compounds containing a halogen atom. Particularly preferable specific examples thereof are diphenyldichlorosilane, dihexyldichlorosilane, dioctyldichlorosilane, dibutyldichlorosilane, dimethyldichlorosilane, methyldichlorosilane, phenyltrichlorosilane, hexyltrichlorosilane, octyltrichlorosilane, butyltrichlorosilane, methyltrichlorosilane, silicon tetrachloride, and the like.

The silane compound for introducing an alkoxy group may be exemplified by silane compounds containing an alkoxy group. Particularly preferable specific examples thereof are ethoxytrimethylsilane, diethoxydimethylsilane, triethoxymethylsilane, tetraethoxysilane, and the like.

The silane compound for introducing an amino group may be exemplified by alkoxysilane compounds having a structure in which two silicon atoms bond to a nitrogen atom. Specific examples thereof are N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, and N,N-bis(trimethylsilyl)aminoethylmethyldiethoxysilane, and the like. Among these, N,N-bis(trimethylsilyl)aminopropylmethyldimethoxysilane, N,N-bis(trimethylsilyl)aminopropylmethyldiethoxysilane, and 1-trimethylsilyl-2,2-dimethoxy-1-aza-2-silacyclopentane are preferred; and N,N-bis(trimethylsilyl)aminopropylmethyldimethoxysilane, N,N- bis(trimethylsilyl)aminopropylmethyldiethoxysilane, and 1-trimethylsilyl-2,2-dimethoxy-1-aza-2-silacyclopentane are particularly preferred.

The silane compound for introducing a hydroxyl group may be exemplified by alkoxysilane compounds containing an epoxy group. Specific examples thereof are 2-glycidoxyethyltrimethoxysilane, 2-glycidoxyethyltriethoxysilane, (2-glycidoxyethyl) methyldimethoxysilane, 3-glycidoxypropyltrimethoxysilane, 3-glycidoxypropyltriethoxysilane, (3-glycidoxypropyl) methyldimethoxysilane, 2-(3,4-epoxycyclohexyl) ethyltrimethoxysilane, 2-(3,4-epoxycyclohexyl) ethyltriethoxysilane, 2-(3,4-epoxycyclohexyl) ethyl(methyl) dimethoxysilane, and the like. Among these, 3-glycidoxypropyltrimethoxysilane and 2-(3,4-epoxycyclohexyl) ethyltrimethoxysilane are particularly preferred.

The silane compound for introducing an isocyanate group may be exemplified by alkoxysilane compounds containing an isocyanate group. Specific examples of the alkoxysilane compounds containing an isocyanate group are 3-isocyanatepropyltrimethoxysilane, 3-isocyanatepropyltriethoxysilane, 3-isocyanatepropylmethyldiethoxysilane, 3-isocyanatepropyltriisopropoxysilane, and the like. Among these, 3-isocyanatepropyltrimethoxysilane is particularly preferred.

The silane compound used may be a partial condensation product of these alkoxysilane compounds.

The germane compound may be exemplified by alkoxygermane compounds such as monoalkoxygermane compounds, dialkoxygermane compounds, trialkoxygermane compounds, and tetraalkoxygermane compounds. In addition, the germane compound may be those similar to the silane compounds exemplified above in which a silicon atom is substituted with a germanium atom.

The stannane compound may be exemplified by alkoxystannane compounds such as monoalkoxystannane compounds, dialkoxystannane compounds, trialkoxystannane compounds, and tetraalkoxystannane compounds. In addition, the stannane compound may be those similar to the silane compounds exemplified above where a silicon atom is substituted with a tin atom.

The denaturant (m) used may be the denaturant (x) described later as a silane compound, a germane compound, or a stannane compound.

The above-mentioned aldehyde compound used may be the compounds represented by the above formula (z3); examples thereof include dialkylaminobenzaldehyde, dialkylaminopropionaldehyde, and the like.

The above-mentioned ketone compound used may be the compounds represented by the above formula (z3); examples thereof include benzophenone, 4,4'-dialkylaminobenzophenone, and the like.

The above-mentioned amide compound used may be the compounds represented by the above formula (z3); examples thereof include N-methyloxazolidinone, N-methylcaprolactam, 1,3-dimethyl-2-imidazolidinone, and the like.

The above-mentioned isocyanate compound used may be the compounds represented by the above formula (z4); examples thereof include tolylene diisocyanate, diphenylmethane diisocyanate, and the like.

The above-mentioned epoxy compound used may be the compounds represented by the above formula (z2); examples thereof include ethylene oxide, propylene oxide, epoxycyclohexene, ethyleneglycol diglycidyl ether, neopentyl glycol diglycidyl ether, polypropylene glycol diglycidyl ether, polyethylene glycol diglycidyl ether, trimethylolpropane polyglycidyl ether, glycerolpolyglycidyl ether, sorbitolpolyglycidyl ether, bisphenol A diglycidyl ether, N,N-diglycidylaniline, N,N-diglycidyltoluidine, N,N-diglycidyl-3-glycidyloxyaniline, N,N-diglycidyl-2-glycidyloxyaniline, N,N,N',N'-tetraglycidylaminodiphenylmethane, N,N-diglycidylbutylamine, triglycidylisocyanurate, epoxidized soybean oil, and the like.

The polymerization initiator (m) in the above-mentioned method (ii) may be exemplified by amine compounds such as secondary amines. In particular, the compounds represented by the formulae (w1) to (w3) below, respectively, may be preferably used.

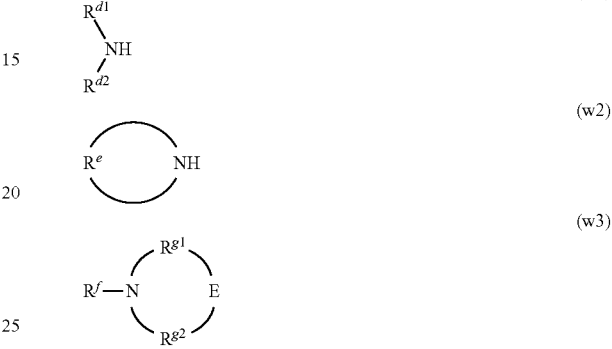

In the formulae (w1) to (w3), $R^{d1}$, $R^{d2}$, and $R^f$ are each independently a hydrogen atom or a hydrocarbon group having 1 to 18 carbon atoms; $R^e$, $R^{g1}$, and $R^{g2}$ are each independently a hydrocarbon group having 2 to 12 carbon atoms; E is an oxygen atom or NR''; and R'' is a hydrogen atom or a monovalent organic group.

The above-mentioned amine compound may be exemplified by dialkylamines such as dimethylamine, diethylamine, di-n-propylamine, di-1-propylamine, di-n-butylamine, di-sec-butylamine, di-t-butylamine, dipentylamine, di-n-octylamine, di-2-ethylhexylamine; dicyclohexylamine, N-methylbenzylamine, diallylamine, and the like; cyclic amines such as morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5.5]undecane, azabicyclo[3.2.2]nonane, carbazole, piperazine, N-methylpiperazine, N-ethylpiperazine, N-butylpiperazine, and N-2-ethylhexylpiperazine. Among these, cyclic secondary amines and dialkylamines are preferred; piperidine, pyrrolidine, hexamethyleneimine, di-n-butylamine, and di-sec-butylamine are more preferred; and piperidine is particularly preferred.

These amine compounds may be used as an initiator by reaction with an organic alkali metal compound. By use of a reaction product between an organic alkali metal and the amine compounds as a polymerization initiator, an amino group may be introduced into an end of the resulting polymer.

The monomer (m) in the above-mentioned method (iii) may be exemplified by (meth)acrylate compounds having at least one of a nitrogen atom, an oxygen atom, and a silicon atom. Examples thereof include dialkylaminoalkyl (meth)acrylate, dialkylaminoaryl (meth)acrylate, and the like.

The monomer (m) in the above-mentioned method (iv) may be exemplified by ammonia, alkylamines, water, and the like. in a case in which the polymer has a halogen atom.

Preferably, the polymer (A) is obtained by reacting an active end of the polymer having at least one structural unit selected from the group consisting of structural units represented by the formulae (a1) to (a5), respectively, with the denaturant (m) containing a nitrogen atom, an oxygen atom, a silicon atom, a germanium atom, a tin atom or a combination thereof to thereby form a bond.

Preferably, the denaturant (m) is represented by the above formula (x) (the denaturant (m) is also referred to as "denaturant (x)"). When the denaturant (m) is the denaturant (x), the polymer (A) having a silicon atom, a germanium atom, or a tin atom as the functional group (f) may be conveniently obtained.

In the above formula (x), $R^1$ is a hydrogen atom or a monovalent hydrocarbon group; M is a silicon atom, a germanium atom, or a tin atom; $X^1$ is a halogen atom or an alkoxy group; n1 is an integer of from 2 to 4; and wherein, in a case in which $R^1$ is preset in a plurality of number, the plurality of $R^1$s are each identical or different, and in a case in which $X^1$ is preset in a plurality of number, the plurality of $X^1$s are each identical or different.

The monovalent hydrocarbon group represented by $R^1$ may be exemplified by alkyl groups having 1 to 12 carbon atoms such as a methyl group, a butyl group, a hexyl group, and an octyl group; a phenyl group, and the like; and a methyl group is preferred.

The halogen atom represented by $X^1$ may be exemplified by a chlorine atom, a bromine atom, and the like; and a chlorine atom is preferred.

The alkoxy group represented by $X^1$ may be exemplified by a methoxy group, an ethoxy group, a propoxy group, and the like; and a methoxy group and an ethoxy group are preferred.

Specifically, the preferred denaturant (x) is silane compounds containing a halogen atom, germanium compounds containing a halogen atom, tin compounds containing a halogen atom, silane compounds containing an alkoxy group, germanium compounds containing an alkoxy group, and tin compounds containing an alkoxy group; among these, silane compounds containing a chlorine atom, germanium compounds containing a chlorine atom, and tin compounds containing a chlorine atom are particularly preferred.

The silane compound containing a chlorine atom may be exemplified by diphenyldichlorosilane, dihexyldichlorosilane, dioctyldichlorosilane, dibutyldichlorosilane, dimethyldichlorosilane, phenyltrichlorosilane, hexyltrichlorosilane, octyltrichlorosilane, butyltrichlorosilane, methyltrichlorosilane, silicon tetrachloride, and the like.

The germanium compound containing a chlorine atom may be exemplified by dimethylgermanium chloride, dibutylgermanium dichloride, diphenylgermanium dichloride, butylgermanium trichloride, germanium tetrachloride, and the like.

The tin compound containing a chlorine atom may be exemplified by dimethyltin dichloride, dibutyltin dichloride, dihexyltin dichloride, dioctyltin dichloride, phenyltin trichloride, butyltin trichloride, octyltin trichloride, tin tetrachloride, and the like.

The denaturant (x) is reacted with an active end of the polymer, after polymerization reaction, having at least one structural unit selected from the group consisting of structural units represented by the above formulae (a1) to (a5), respectively, to form a bond, thereby forming the polymer represented by the above formula (p), for example.

In the above formula (P), L is a polymer chain having at least one structural unit selected from the group consisting of structural units represented by the above formulae (a1) to (a5), respectively; M is a silicon atom, a germanium atom, or a tin atom; Y is a hydrogen atom, a monovalent hydrocarbon group, a halogen atom, or an alkoxy group; a is an integer of from 2 to 4; and wherein, in a case in which L is preset in a plurality of number, the plurality of Ls are each identical or different, and in a case in which Y is preset in a plurality of number, the plurality of Ys are each identical or different.

The above-mentioned Y may be exemplified by the groups similar to the monovalent hydrocarbon groups exemplified for $R^1$ and to halogen atoms or alkoxy groups exemplified for $X^1$ in the denaturant (x).

When the polymer (A) is defined as such a polymer, the polymer can have various structures and thus can provide the binder composition for batteries with various properties.

Here, the above-mentioned methods to introduce the functional group (f) into the polymer may be used alone or in combination, and also (a) and/or (b) below may be used as a denaturant for forming such a polymer.

(a) Compounds Represented by the Formula (y) Below (Hereinafter, Also Referred to as "Halogenated Hydrocarbon Compound")

$$R^2_{4-n2}CX^2_{n2} \quad (y)$$

In the above formula (y), $R^2$ is a hydrogen atom or a monovalent hydrocarbon group; $X^2$ is a halogen atom or an alkoxy group; and n2 is an integer of from 2 to 4.

(b) Vinyl Group-Containing Compounds Having Two or More Vinyl Groups in a Molecule The hydrocarbon group represented by $R^2$ in the above formula (y) may be exemplified by alkyl groups having 1 to 12 carbon atoms such as a methyl group, an ethyl group, and a butyl group; and a methyl group is preferred.

The halogen atom represented by $X^2$ may be exemplified by chlorine atom, bromine atom, iodine atom, and fluorine atom; and chlorine atom, bromine atom, and iodine atom are preferred. The alkoxy group represented by $X^2$ may be exemplified by a methoxy group, an ethoxy group, a propoxy group, and the like; and a methoxy group and an ethoxy group are preferred.

The above-mentioned halogenated hydrocarbon compound may be exemplified by carbon tetrachloride, carbon tetrabromide, carbon tetraiodide, chloroform, tribromomethane, triiodomethane, dichloromethane, dibromomethane, diiodomethane, trichloroethane, dichloroethane, and the like.

The vinyl group-containing compound having two or more vinyl groups in a molecule is preferably aromatic compounds such as divinylbenzene, divinylbiphenyl, and vinylnaphthalene, and mixtures of these aromatic compounds.

When the polymer (A) is a copolymer, sequential order of structural units in the polymer (A) is not particularly limited. That is, the polymer (A) may be a block copolymer or a random copolymer.

In the polymer (A), a coupling rate is preferably no greater than 80% by mass, more preferably from 10% to 80% by mass, and still more preferably from 20% to 70% by mass. When the coupling rate is less than the lower limit, adhesion between the resulting binder and current collectors etc. is likely to be lower.

Here, the "coupling rate" in this specification means an existing rate (% by mass) of a polymer bonded by action of a denaturant as a binding reaction agent (polymer coupled by the denaturant in a denaturation reaction) versus an entire polymer. Such a "coupling rate" is an index for estimating an amount of branched structure of the resulting polymer.

The coupling rate of the polymer (A) can be measured by gel permeation chromatography (GPC). Specifically, it can be calculated with respect to a total peak area (S0) of the polymer (A) and a peak area (S1) corresponding to a portion not coupled by the denaturant, measured by the gel permeation chromatography, using the formula (CR) below.

$$\text{Coupling rate (\% by mass)} = (S0 - S1) \times 100 / S0 : (CR)$$

Binding position of the functional group (f) in the polymer (A) is not particularly limited. It may bind directly to a molecular chain of the polymer, may exist in a structural unit of the polymer, or may bind to an end of the polymer. These binding types may also be combined. Among these, preferably, it binds to an end of the polymer from the viewpoint of effectively improving adhesion of the binder.

Lower limit of the content of the functional group (f) in the polymer (A) is preferably 0.0005 mol/kg, more preferably 0.001 mol/kg, still more preferably 0.002 mol/kg, and particularly preferably 0.005 mol/kg. On the other hand, upper limit of the content is preferably 0.2 mol/kg, more preferably 0.15 mol/kg, still more preferably 0.10 mol/kg, and particularly preferably 0.05 mol/kg. When the content of the functional group (f) in the polymer (A) falls within this range, storage stability of the binder composition for batteries and adhesion of the resulting binder may be improved.

Solubility

It is necessary in the embodiment of the present invention that the polymer (A) has a solubility of no less than 5 g in 100 g of cyclohexane at 25° C. and 1 atom. The solubility of the polymer (A) is preferably no less than 7 g in 100 g, more preferably no less than 9 g in 100 g, and still more preferably no less than 10 g in 100 g of cyclohexane. When the solubility of the polymer (A) falls within this range, the polymer may be dissolved in a nonpolar or low-polar organic liquid medium etc., consequently, the binder composition for batteries may be far from deterioration or degradation of electrode active materials compounded therewith in forming electrodes. Furthermore, workability may be improved when producing electrodes since the polymer (A) may be uniformly dissolved in organic liquid media etc., and also performance of resulting electrodes etc. may be improved since the binder is uniformly formed.

Weight average molecular weight (hereinafter, also referred to as "Mw") of the polymer (A) is preferably from 50,000 to 1,700,000, more preferably from 60,000 to 1,600,000, and particularly preferably from 70,000 to 1,500,000. When the Mw of the polymer (A) falls within this range, viscosity of the slurry for battery electrodes containing the binder composition for batteries and electrode active materials may be adequate and thus workability may be improved when producing electrodes.

The ratio (Mw/Mn ratio) of weight average molecular weight (Mw) versus number average molecular weight (hereinafter, also referred to as "Mn") of the polymer (A) is preferably no greater than 3, more preferably no greater than 2.8, and particularly preferably no greater than 2.5. When the Mw/Mn ratio falls within this range, adhesion of the resulting binder may be improved.

Glass transition point (hereinafter, also referred to as "Tg") of the polymer (A) is preferably from −120° C. to 50° C., more preferably from −110° C. to 30° C., and particularly preferably from −100° C. to −10° C. When the Tg of the polymer (A) falls within this range, adhesion of the resulting binder may be further improved.

Method of Synthesizing Polymer (A)

The polymer (A) may be synthesized by polymerizing a monomer containing a conjugated diene compound etc. and, as necessary, carrying out a coupling reaction and/or hydrogenation reaction, for example. The method of introducing the functional group (f) into the polymer may be those described above.

Polymerization Reaction

The polymerization reaction is typically carried out using a conjugated diene compound and, as necessary, an aromatic vinyl compound and other monomers in the presence of a polymerization initiator in a hydrocarbon medium. When the functional group (f) is introduced into the polymer by copolymerizing the above-mentioned monomer (m), the above-mentioned monomer (m) is added to the polymerization reaction system.

The hydrocarbon medium used in the polymerization reaction may be exemplified by pentane, hexane, heptane, methylcyclopentane, cyclohexane, benzene, toluene, xylene, and the like. Among these, cyclohexane and heptane are preferred.

The amount of the hydrocarbon medium used is an amount in which total concentration of monomer compounds in a polymerization reaction liquid is preferably from 5% to 30% by mass and more preferably from 7% to 20% by mass.

In regards to the polymerization initiator, organic alkali metals or organic alkali earth metals may be favorably used. Specifically, in addition to the above-mentioned polymerization initiator (m) containing the above-mentioned particular atom, alkyl lithiums such as n-butyl lithium, sec-butyl lithium, and t-butyl lithium; alkylene dilithiums such as 1,4-dilithiobutane; phenyl lithium, stilbene lithium, lithium naphthalene, sodium naphthalene, potassium naphthalene, n-butyl magnesium, n-hexyl magnesium, ethoxy barium, isopropoxy barium, ethylmercapto barium, t-butoxy barium, phenoxy barium, diethylamino barium, barium stearate, and the like may be exemplified.

In addition, a reaction product between an organic alkali metal and an amine compound may be used as the polymerization initiator. When the reaction product between an organic alkali metal and an amine compound is used as the polymerization initiator, an amino group may be introduced into an end of the resulting polymer. The organic alkali metal is preferably organic lithium compounds and more preferably n-butyl lithium or sec-butyl lithium. Furthermore, the amine compound is preferably secondary amine compounds; in view of excellent adhesion of the resulting binder, dialkylamines and cyclic amines are preferred, amine compounds represented by the above formulae (w1) to (w3) are more preferred, and piperidine is most preferred. Here, the reaction product between an organic alkali metal and an amine compound used as the polymerization initiator may be lithium amide compounds or other compounds.

When using an organic alkali metal or an organic alkali earth metal as the polymerization initiator in the polymerization reaction, a polymer with a highly reactive end may be prepared, thus denaturation of the resulting polymer may be facilitate by the denaturant.

The amount of the polymerization initiator used may be decided depending on a molecular weight of an intended polymer without particular limitation thereto.

When the functional group (f) is introduced using the above-mentioned polymerization initiator containing the functional group (f), a compound which includes the polymerization initiator containing the functional group (f) is added to the polymerization reaction system as the polymerization initiator.

In the polymerization reaction, the content of 1,2-vinyl bond in the resulting polymer may be controlled by adding a vinyl control agent to the reaction system.

Specifically, ether compounds such as tetrahydrofuran, diethyl ether, dimethoxybenzene, dimethoxyethane, and ethyleneglycol dibutyl ether; and tertiary amine compounds such as triethylamine, pyridine, N,N,N',N'-tetramethyl ethylenediamine, and dipiperidino ethane may be used as the vinyl control agent, for example.

Preferably, the polymerization reaction is carried out by a living anionic polymerization. When the polymerization reaction is carried out by a living anionic polymerization, molecular weight distribution (Mw/Mn ratio) of the resulting polymer may be lowered, thus adhesion of the resulting polymer may be improved. In addition, a minute amount of insoluble matter of the resulting polymer in nonpolar organic liquid media may be suppressed, thus uniformity of resulting electrode layers may be enhanced, and workability and performances of resulting electrodes etc. may be further improved. Furthermore, when the living anionic polymerization is employed, the functional group (f) may be conveniently introduced into an end of the polymer while maintaining the solubility in cyclohexane by the method of introducing an end group into the polymer in the denaturation reaction shown below. A predetermined combination of above-mentioned conditions such as a polymerization initiator, a solvent, and a temperature is selected, then the living anionic polymerization may be carried out by a conventional method.

Denaturation Reaction

The functional group (f) may also be introduced by reaction with an active end of the polymer after the above-mentioned polymerization reaction to form a bond (hereinafter, this reaction is also referred to as "denaturation reaction"). The denaturation reaction of the denaturant (m) with an active end of the polymer is typically carried out by the processes below. Here, the denaturation reaction is typically carried out after the polymerization reaction and before carrying out procedures necessary for separating the polymer such as solvent-removal treatment, water treatment, and heat treatment.

Preferably, the denaturation reaction is carried out as a solution reaction, in which a solution containing an unreacted monomer used in the polymerization reaction may be allowable. The type of the denaturation reaction is also not particularly limited; it may be carried out using a batch-type reactor or may be carried out continuously using an apparatus such as a multistage continuous reactor and an inline mixer. Here, it is preferred in the polymer subjected to the denaturation reaction that at least 10% by mol of polymer chains thereof has a living property.

Temperature at the denaturation reaction may be similar to the temperature at the polymerization reaction. Specifically, it is preferably from 20° C. to 100° C. and more preferably from 40° C. to 90° C. When the temperature at the denaturation reaction falls within this range, the denaturation reaction may be progressed effectively and addition rate of the denaturant (m) to the polymer end may be enhanced. Reaction time of the denaturation reaction is typically from 5 minutes to 5 hours and preferably from 15 minutes to 1 hour.

The amount of the denaturant (m) used is preferably from 0.000001 to 0.01 mol per 1 mol of the polymer and more preferably from 0.00001 to 0.001 mol per 1 mol of the polymer. When the amount of the denaturant (m) used falls within this range, the denaturation reaction may be progressed effectively.

The method of adding the denaturant is not particularly limited thereto, and collective addition methods, divisional addition methods, continuous addition methods, etc. may be allowable. Among these, a collective addition method is preferred.

Coupling Reaction

The method of coupling the polymer resulting from the polymerization reaction with the denaturant may be a conventional method.

Hydrogenation Reaction

The method of hydrogenating the polymer, having a double bond and resulting from the polymerization, may be a conventional method and exemplified by a method of dissolving the polymer, having a double bond, in an appropriate solvent and treating with hydrogen gas in the presence of a hydrogenation catalyst.

The condition of treating with hydrogen gas is not particularly limited thereto and is typically from 20° C. to 150° C. in hydrogen pressurized from 0.1 to 10 MPa. Here, the hydrogenation rate may be optionally changed by modifying conditions such as catalyst amount, hydrogen pressure, and reaction time.

The solvent used in the hydrogenation reaction may be hydrocarbon solvents similar to the solvent used in the above-mentioned polymerization, for example.

The hydrogenation catalyst used may be compounds containing an element such as Ti, V, Co, Ni, Zr, Ru, Rh, Pd, Hf, Re, and Pt.

Specifically, metallocene compounds of Ti, Co, Ni, Zr, Ru, Rh, Pd, Hf, Re, Pt, etc.; heterogeneous catalysts in which a metal such as Pd, Ni, Pt, Rh, and Ru is carried on a carrier such as carbon, silica, alumina, and diatomite; homogeneous Ziegler-type catalysts where an organic salt or an acetylacetone salt of metal elements such as Co and Ni and a reducing agent such as an organic aluminum are combined; organic metal compounds or complexes of Ru, Rh, etc.; fullerene or carbon nanotube where hydrogen is stored, and the like may be exemplified.

Among these, metallocene compounds of Ti, Co, Ni, Zr, or Hf are preferably used, and metallocene compounds of Ti, Zr, or Hf are more preferably, since homogeneous hydrogenation reaction may be carried out even in an inactive organic solvent (specifically, hydrocarbon solvents such as alkanes, cycloalkanes, toluene, and xylene; polar solvents such as methyl ethyl ketone, ethyl acetate, ethyl ether, and tetrahydrofuran); and a catalyst prepared by reaction of a titanocene compound and an alkyl lithium is particularly preferably used due to an inexpensive price and industrial availability.

Here, the catalyst prepared by reaction of a titanocene and an alkyl lithium may be exemplified by those described in Japanese Unexamined Patent Application, Publication Nos. H1-275605, H5-271326, H5-271325, H5-222115, H11-292924, 2000-37632, S59-133203, Japanese Examined Patent Publication No. S63-5401, Japanese Unexamined Patent Application, Publication Nos. S62-218403 and H7-90017, and Japanese Examined Patent Publication Nos. S43-19960 and 547-40473. Here, these catalysts may be used alone or in a combination of two or more.

Liquid Medium (B)

The binder composition for batteries of the embodiment of the present invention contains the liquid medium (B). A nonpolar organic liquid medium is favorably used for the liquid medium (B) in the binder composition for batteries without particular limitation thereto from the viewpoint of suppressing deterioration etc. of electrode active materials compounded together with the binder composition for batteries when forming battery electrodes.

Nonpolar Organic Liquid Medium

The nonpolar organic liquid medium used in the binder composition for batteries is not particularly limited thereto; for example, aliphatic hydrocarbon solvents such as hexane, heptane, octane, decane, and dodecane, alicyclic hydrocarbon solvents such as cyclohexane, cycloheptane, cyclooctane, cyclodecane, and cyclododecane, and aromatic hydrocarbon solvents such as toluene, xylene, mesitylene, and cumene may be used. These solvents may be used alone or in a combination of two or more.

The amount of the liquid medium (B) is preferably from 2 to 10,000 parts by mass with respect to 100 parts by mass of the polymer (A), more preferably from 10 to 2,000 parts by mass, still more preferably from 20 to 500 parts by mass, and particularly preferably from 30 to 200 parts by mass. When the amount of the liquid medium (B) falls within this range, workability at the time of using the resulting binder composition for batteries and the slurry for battery electrodes resulting therefrom may be improved.

Method of Preparing Binder Composition for Batteries

The binder composition for batteries may be prepared by adding the liquid medium (B) preferably the nonpolar organic liquid medium to the polymer (A), if necessary further adding other optional components thereto, and appropriately stirring them to thereby dissolve the polymer (A).

The binder composition for batteries allows to form a binder that has high adhesion not only to current collectors of electrodes but also to solid electrolyte materials and to improve electrical conductivity of solid electrolyte layers with reducing the amount used thereof, therefore, it can be favorably used for all-solid-state batteries.

Slurry for Battery Electrodes

The slurry for battery electrodes of the embodiment of the present invention contains an electrode active material and the binder composition for batteries. By including the binder composition for batteries, the slurry for battery electrodes may be excellent in storage stability since deterioration etc. of the electrode active material may be suppressed; consequently, performance of electrodes or batteries formed from the slurry for battery electrodes may be improved. Furthermore, the slurry for battery electrodes allows to form uniform electrode layers, thus workability is excellent when producing electrodes. The slurry for battery electrodes may be used as a material for forming both of positive and negative electrodes.

The electrode active material used for positive electrodes may be inorganic compounds such as $MnO_2$, $MoO_3$, $V_2O_5$, $V_6O_{13}$, $Fe_2O_3$, $Fe_3O_4$, $Li_{(1-x)}CoO_2$, $Li_{(1-x)}NiO_2$, $LixCo_yS_nzO_2$, $Li_{(1-x)}Co_{(1-y)}Ni_yO_2$, $TiS_2$, $TiS_3$, $MoS_3$, $FeS_2$, $CuF_2$, and $NiF_2$; carbon materials such as carbon fluoride, graphite, vapor-grown carbon fiber and/or ground products thereof, PAN-type carbon fiber and/or ground products thereof, and pitch-type carbon fiber and/or ground products thereof; and electric conductive polymers such as polyacetylene and poly-p-phenylene, for example.

The electrode active material used for negative electrodes may be carbon materials such as carbon fluoride, graphite, vapor-grown carbon fiber and/or ground products thereof, PAN-type carbon fiber and/or ground products thereof, and pitch-type carbon fiber and/or ground products thereof; electric conductive polymers such as polyacetylene and poly-p-phenylene, and amorphous compounds of tin oxide or compounds of fluorine, for example.

The amount of the electrode active material in the slurry for battery electrodes is preferably from 100 to 50,000 parts by mass with respect to 100 parts by mass of the polymer (A) in the binder composition for batteries, more preferably from 1,000 to 20,000 parts by mass, and still more preferably from 3,000 to 10,000 parts by mass. When the amount of the electrode active material falls within this range, internal impedance or host performance of resulting batteries may be improved since the binder properly covers the surface of the electrode active material.

An additive such as a viscosity-adjusting polymer soluble in a liquid medium, electric conductive carbon like graphite, and a metal powder may be added to the slurry for battery electrodes, as required. A solid electrolyte material may also be included in the slurry for battery electrodes from the viewpoint of improving affinity between the resulting electrode layer and solid electrolyte layers in all-solid-state batteries, etc. In the electrode layer formed from the slurry containing the solid electrolyte material, sufficient adhesion may be obtained between the electrode active material and the solid electrolyte material; therefore, dropout or crack of the electrode active material or the solid electrolyte material, occurring in cases where electrode layers themselves are brittle, is unlikely to occur.

Method of Preparing Slurry for Battery Electrodes

The slurry for battery electrodes of the embodiment of the present invention may be prepared by mixing the binder composition for batteries, an electrode active material, and additives employed as necessary, using a ball mill, a ribbon mixer, or a pin mixer, for example. In regards to other preparation methods, the polymer (A) used in the binder composition for batteries, a liquid medium such as the liquid medium (B), and an electrode active material may be mixed. The preparation of the slurry for battery electrodes may be carried out under reduced pressure, thereby generation of bubbles in resulting electrode layers may be prevented.

Solid Electrolyte Composition

The solid electrolyte composition of the embodiment of the present invention contains a solid electrolyte material and the binder composition for batteries. The solid electrolyte composition may be used for forming a solid electrolyte layer to construct an all-solid-state battery. The binder composition for batteries in the solid electrolyte composition allows to form a binder having high adhesion with solid electrolyte materials, therefore, solid electrolyte layers with high durability may be formed. Furthermore, the binder amount may be reduced in relation to solid electrolyte materials in solid electrolyte layers, therefore, solid electrolyte layers with high electrical conductivity may be formed.

The solid electrolyte material used may be conventional one without particular limitation thereto; for example, those described in paragraphs from [0004] to [0008], [0024] and [0025] in Japanese Unexamined Patent Application, Publication No. H11-86899 may be used. A calcined material resulting from a green sheet containing a solid electrolyte material such as a lithium ion conductive inorganic powder may be exemplified. The lithium ion conductive inorganic powder used may be a product of milling a lithium ion conductive glass ceramic as described in Japanese Unexamined Patent Application, Publication No. 2007-134305.

Method of Preparing Solid Electrolyte Composition

The solid electrolyte composition of the embodiment of the present invention may be prepared by mixing the binder composition for batteries and a solid electrolyte material, using a ball mill, a ribbon mixer, or a pin mixer, for example. In regards to other preparation methods, the polymer (A) used in the binder composition for batteries, a liquid medium such as the liquid medium (B), and a solid electrolyte material may be mixed. The preparation of the solid electrolyte composition may be carried out under reduced pressure, thereby generation of bubbles in resulting solid electrolyte layers may be prevented.

Electrode

The electrode of the embodiment of the present invention is equipped with a current collector and an electrode layer laminated on at least a part of the current collector, in which the electrode layer is formed from the slurry for battery electrodes.

Since the electrode is formed from the slurry for battery electrodes having the above-mentioned properties, adhesion between the binder and current collectors is high and durability thereof is excellent. Furthermore, since the electrode active material resistant to deterioration or degradation is employed in the electrode, electric characteristics thereof are excellent.

The electrode may be formed by coating and drying the slurry for battery electrodes on a surface of a current collector and then press-working the resulting coating film to thereby laminate an electrode layer on the surface of the current collector, for example.

The current collector used may be those of metal foils, etched metal foils, expanded metal foils, etc.; and the material of the current collector may be appropriately selected from metal materials such as aluminum, copper, nickel, tantalum, stainless, and titanium depending on the type of an intended energy device.

Here, thickness of the current collector is from 5 to 30 μm and preferably from 8 to 25 μm when forming an electrode for lithium secondary batteries, for example.

In regards to the means for coating the slurry for battery electrodes, a doctor blade process, a reverse control process, a comma bar process, a gravure process, an air knife process, etc. may be utilized.

In regards to drying conditions of the coated film of the slurry for battery electrodes, process temperature is preferably from 20° C. to 250° C. and more preferably from 50° C. to 150° C., and process time is preferably from 1 to 120 minutes and more preferably from 5 to 60 minutes.

Furthermore, in regards to the means of press-working, a high-pressure super press, a soft calender, or a 1-ton press, may be utilized, for example. Press working conditions may be approximately selected depending on a processing machine used.

The electrode layer on the current collector formed in this way has a thickness of from 40 to 100 μm and a density of from 1.3 to 2.0 g/cm$^3$, for example.

The electrode is excellent in adhesion not only between the binder and the current collector but also between the binder and the solid electrolyte material thus may be favorably used for all-solid-state batteries. Furthermore, by virtue of the high adhesion, the amount of the binder used may be reduced; consequently, electrical conductivity may be increased at the parts of the solid electrolyte. Specific examples of the electrode for all-solid-state batteries may be exemplified by positive electrodes and/or negative electrodes for all-solid-state lithium secondary batteries, for example.

All-Solid-State Battery

The all-solid-state battery of the embodiment of the present invention is equipped with a pair of electrodes disposed such that electrode layers are opposed and a solid electrolyte layer disposed between the pair of electrodes.

Since the all-solid-state battery is equipped with the electrode and the solid electrolyte layer, the all-solid-state battery is excellent in durability and also in electric characteristics such as electrical conductivity, i.e. lower internal impedance of the solid electrolyte layer. Examples of the all-solid-state battery are all-solid-state lithium secondary batteries.

The all-solid-state battery may be obtained by disposing the solid electrolyte layer adjacently between the pair of electrodes. The solid electrolyte material for forming the solid electrolyte layer is not particularly limited thereto and may be exemplified by solid electrolyte materials for forming the above-mentioned solid electrolyte composition. It is also preferred that the solid electrolyte layer is formed from the above-mentioned solid electrolyte composition from the viewpoint that durability and electric performance of the all-solid-state battery are further improved.

EXAMPLES

Hereinafter, the embodiments of the present invention is further explained in detail with reference to Synthetic Examples and Examples; however, the present invention is not limited to these Examples. Methods of measuring values of various physical properties are shown below.

Measurement of 1,2-Vinyl Bond Content 1,2-Vinyl bond content in a polymer (hereinafter, also referred to as "vinyl bond content", unit: % by mol) was measured by IR spectroscopy and determined by a Hampton method.

Functional Group Content

A content of an amino group, a hydroxyl group, a carboxyl group, or an alkoxysilyl group included in the polymer (A) was measured by the methods below.

Amino Group Content (mol/kg)

A polymer was initially dissolved in toluene and then precipitated in a large amount of methanol, thereby amino group-containing compounds not bonding to the polymer was separated and then dried. Next, using this sample, a total amino group content was determined by "Testing method for total amine values" described in JIS K7237.

Hydroxyl Group Content (mol/kg)

Similarly to the "amino group content", a total hydroxyl group content was determined with respect to a sample obtained by separating hydroxyl group-containing compounds not bonding to a polymer, in accordance with the method described in JIS K1557-1.

Carboxyl Group Content (mol/kg)

Similarly to the "amino group content", a total carboxyl group content was determined with respect to a sample obtained by separating carboxyl group-containing compounds not bonding to a polymer, in accordance with the method described in JIS K1557-5.

Alkoxysilyl Group Content (mol/kg)

Similarly to the "amino group content", a sample obtained by separating alkoxysilyl group-containing compounds not bonding to a polymer was dissolved in carbon disulfide, then an absorption intensity at near 1,150 cm$^{-1}$ derived from Si—O—C bond in an IR absorption spectrum measured using a solution cell was measured, and an alkoxysilyl group content was determined based on a calibration curve prepared using a carbon disulfide solution of a denaturant used for denaturing the polymer.

Weight Average Molecular Weight (Mw), Number Average Molecular Weight (Mn), and Molecular Weight Distribution (Mw/Mn)

Measurement was carried out by gel permeation chromatography (GPC) using a column (manufactured by Tosoh Co., GMH$_{HR}$-H) at temperature condition 50° C., and a weight average molecular weight (Mw) and a number average molecular weight (Mn) in terms of polystyrene were determined, and also a molecular weight distribution (Mw/Mn) was determined from these values.

Hydrogenation Rate

A hydrogenation rate at double bonds in a polymer was determined by measuring $^1$H-NMR at 500 MHz using carbon tetrachloride as a solvent and calculating from a peak area of the resulting spectrum.

Solubility in Cyclohexane

Under a condition of 25° C. and 1 atom, 20 g of the polymer (A) was weighed in a flask, then to which 100 g of cyclohexane (manufactured by Wako Pure Chemical Industries, Ltd., highest quality) was added and stirred at 25° C. for 1 day. The resulting solution was filtered through a wire screen of 100 mesh.

Solubility of polymer (A) (g per 100 g)=20-X

Synthesis of Polymer (A)

Synthesis Example 1

Synthesis of Polymer (A-1)

Into a nitrogen-flushed reaction container of inner volume 50 L, 25 kg of cyclohexane as a hydrocarbon solvent, 50 g of tetrahydrofuran as a vinyl control agent, 1.76 g (27.4 mmol) of n-butyl lithium as a polymerization initiator, and 2,500 g of 1,3-butadiene as a monomer were introduced and subjected to adiabatic polymerization under a condition of polymerization initiation temperature 50° C., thereby obtaining a conjugated diene polymer.

Thereafter, 27.4 mmol of N,N-bis(trimethylsilyl)aminopropylmethyldiethoxysilane (BTADS) as a denaturant (m) was added into the reaction container and allowed to react for 30 minutes. An addition rate of the denaturant (m) to a polymer end was 81%.

Thereafter, a hydrogen gas supply pressure was set to 0.7 MPa (gauge pressure) and the reaction solution was adjusted to 90° C., then hydrogenation reaction was initiated by adding a hydrogenation catalyst based on titanocene dichloride, and the reaction container was flushed with nitrogen when hydrogen adsorption in the denatured conjugated diene polymer had reached an integrated amount of a target hydrogenation rate (95% by mol), thereby obtaining a polymer solution containing a hydrogenated conjugated diene polymer. The polymer solution was added with 2,6-di-t-butyl-p-cresol and then subjected to solvent removal by steam stripping followed by drying using a hot roll heated to 110° C., thereby obtaining a rubbery hydrogenated conjugated diene polymer (hereinafter, also referred to as "polymer (A-1)"). The polymer (A-1) had a weight average molecular weight of 286× $10^3$, a molecular weight distribution (Mw/Mn ratio) of 1.2, a 1,2-vinyl bond content of 42% by mol, and a hydrogenation rate of 96% by mol. Additionally, the solubility of the polymer (A-1) at 25° C. and 1 atom was 19 g in 100 g of cyclohexane, and the content of functional group (f) was 0.0178 mol/kg.

Synthesis Example 2

Synthesis of Polymer (A-2)

A rubbery hydrogenated conjugated diene polymer (hereinafter, also referred to as "polymer (A-2)") was obtained by a method similar to that of Synthesis Example 1, except that the amount of tetrahydrofuran introduced as a vinyl control agent was changed from 50 g to 25 g.

Synthesis Example 3

Synthesis of Polymer (A-3)

A rubbery hydrogenated conjugated diene polymer (hereinafter, also referred to as "polymer (A-3)") was obtained by a method similar to that of Synthesis Example 1, except that the amount of tetrahydrofuran introduced as a vinyl control agent was changed from 50 g to 200 g.

Synthesis Example 4

Synthesis of Polymer (A-4)

A rubbery hydrogenated conjugated diene polymer (hereinafter, also referred to as "polymer (A-4)") was obtained by a method similar to that of Synthesis Example 1, except that the target hydrogenation rate was changed to 65% by mol.

Synthesis Example 5

Synthesis of Polymer (A-5)

A hydrogenated conjugated diene polymer (hereinafter, also referred to as "polymer (A-5)") was obtained by a method similar to that of Synthesis Example 1, except that the monomer in use was changed to that of the type and the amount shown in Table 1.

Synthesis Example 6

Synthesis of Polymer (A-6)

Into a nitrogen-flushed reaction container of inner volume 50 L, 25 kg of cyclohexane as a hydrocarbon solvent, 50 g of tetrahydrofuran as a vinyl control agent, 1.76 g (27.4 mmol) of n-butyl lithium as a polymerization initiator, 1.81 g (21.2 mmol) of piperidine as an amine compound, and 2,500 g of 1,3-butadiene as a monomer were introduced and subjected to adiabatic polymerization under a condition of polymerization initiation temperature 50° C., thereby obtaining a conjugated diene polymer. An addition rate of piperidine binding to a starting end of the resulting polymer was 71%.

Thereafter, a hydrogen gas supply pressure was set to 0.7 MPa (gauge pressure) and the reaction solution was adjusted to 90° C., then hydrogenation reaction was initiated by adding a hydrogenation catalyst based on titanocene dichloride, and the reaction container was flushed with nitrogen when hydrogen adsorption in the denatured conjugated diene polymer had reached an integrated amount of a target hydrogenation rate (95% by mol), thereby obtaining a polymer solution containing a hydrogenated conjugated diene polymer. The polymer solution was added with 2,6-di-t-butyl-p-cresol and then subjected to solvent removal by steam stripping followed by drying using a hot roll heated to 110° C., thereby obtaining a rubbery hydrogenated conjugated diene polymer (hereinafter, also referred to as "polymer (A-6)").

Synthesis Example 7

Synthesis of Polymer (A-7)

Into a nitrogen-flushed reaction container of inner volume 50 L, 25 kg of cyclohexane as a hydrocarbon solvent, 50 g of tetrahydrofuran as a vinyl control agent, 1.76 g (27.4 mmol) of n-butyl lithium as a polymerization initiator, 1.81 g (21.2 mmol) of piperidine as an amine compound, and 2,500 g of 1,3-butadiene as a monomer were introduced and subjected to adiabatic polymerization under a condition of polymerization initiation temperature 50° C., thereby obtaining a conjugated diene polymer. An addition rate of piperidine binding to a starting end of the resulting polymer was 71%.

Thereafter, 28.3 mmol of N,N-bis(trimethylsilyl)aminopropylmethyldiethoxysilane (BTADS) as a denaturant (m) was added into the reaction container and allowed to react for 30 minutes. An addition rate of the denaturant (m) to polymer end was 81%.

Thereafter, a hydrogen gas supply pressure was set to 0.7 MPa (gauge pressure) and the reaction solution was adjusted to 90° C., then hydrogenation reaction was initiated by adding a hydrogenation catalyst based on titanocene dichloride, and the reaction container was flushed with nitrogen when hydrogen adsorption in the denatured conjugated diene polymer had reached an integrated amount of a target hydrogenation rate (95% by mol), thereby obtaining a polymer solution containing a hydrogenated conjugated diene polymer. The polymer solution was added with 2,6-di-t-butyl-p-cresol and then subjected to solvent removal by steam stripping followed by drying using a hot roll heated to 110° C., thereby obtaining a rubbery hydrogenated conjugated diene polymer (hereinafter, also referred to as "polymer (A-7)").

Synthesis Example 8

Synthesis of Polymer (A-8)

A rubbery hydrogenated conjugated diene polymer (hereinafter, also referred to as "polymer (A-8)") was obtained by a method similar to that of Synthesis Example 1, except that 27.4 mmol of 3-glycidoxypropyltrimethoxysilane (GPMOS) was added as a denaturant (m) in place of BTADS.

Synthesis Example 9

Synthesis of Polymer (A-9)

A rubbery hydrogenated conjugated diene polymer (hereinafter, also referred to as "polymer (A-9)") was obtained by a method similar to that of Synthesis Example 1, except that 27.4 mmol of ethyleneglycol diglycidyl ether was added as a denaturant (m) in place of BTADS.

Synthesis Example 10

Synthesis of Polymer (A-10)

A rubbery hydrogenated conjugated diene polymer (hereinafter, also referred to as "polymer (A-10)") was obtained by a method similar to that of Synthesis Example 1, except that 27.4 mmol of 4,4'-dimethylaminobenzophenone was added as a denaturant (m) in place of BTADS.

Synthesis Example 11

Synthesis of Polymer (A-11)

A rubbery hydrogenated conjugated diene polymer (hereinafter, also referred to as "polymer (A-11)") was obtained by a method similar to that of Synthesis Example 1, except that 9.1 mmol of tetraethoxysilane was added as a denaturant (m) in place of BTADS.

Synthesis Example 12

Synthesis of Polymer (A-12)

A rubbery hydrogenated conjugated diene polymer (hereinafter, also referred to as "polymer (A-12)") was obtained by a method similar to that of Synthesis Example 1, except that end denaturation was carried out by adding 27.4 mmol of ethylene oxide as a denaturant (m) in place of BTADS, followed by neutralization with methanolic hydrogen chloride, methanol coagulation, and vacuum drying at 60° C.

Synthesis Example 13

Synthesis of Polymer (A-13)

A rubbery hydrogenated conjugated diene polymer (hereinafter, also referred to as "polymer (A-13)") was obtained by a method similar to that of Synthesis Example 6, except that end denaturation was carried out by blowing carbon dioxide thereinto as a denaturant (m) in place of BTADS, followed by neutralization with methanolic hydrogen chloride, methanol coagulation, and vacuum drying at 60° C.

Synthesis Example 14

Synthesis of Polymer (A-14)

A rubbery hydrogenated conjugated diene polymer (hereinafter, also referred to as "polymer (A-14)") was obtained by a method similar to that of Synthesis Example 6, except that after a conjugated diene polymer was obtained by a polymerization reaction, 5 mmol of silicon tetrachloride as a denaturant (m) was added into the polymerization reaction container, and a denaturation reaction of the conjugated diene polymer by the denaturant (m) was carried out at 80° C. for 60 minutes. A coupling rate of the polymer (A-14) was measured to be 52%.

Synthesis Example 15

Synthesis of Polymer (A-15)

A rubbery hydrogenated conjugated diene polymer (hereinafter, also referred to as "polymer (A-15)") was obtained by a method similar to that of Synthesis Example 6, except that after a conjugated diene polymer was obtained by a polymerization reaction, 18.4 mmol of dimethyldichlorosilane as a denaturant (m) was added into the polymerization reaction container, and a denaturation reaction of the conjugated diene polymer by the denaturant (m) was carried out at 80° C. for 60 minutes. A coupling rate of the polymer (A-15) was measured to be 65%.

Synthesis Example 16

Synthesis of Polymer (A-16)

A rubbery hydrogenated conjugated diene polymer (hereinafter, also referred to as "polymer (A-16)") was obtained by a method similar to that of Synthesis Example 6, except that after a conjugated diene polymer was obtained by a polymerization reaction, 13.8 mmol of bisphenol A diglycidyl ether as a denaturant (m) was added into the polymerization reaction container, and a denaturation reaction of the conjugated diene polymer by the denaturant (m) was carried out at 80° C. for 60 minutes. A coupling rate of the polymer (A-15) was measured to be 95%.

Synthesis Example 17

Synthesis of Polymer (A-17)

Into a nitrogen-flushed reaction container of inner volume 50 L, 25 kg of cyclohexane as a hydrocarbon solvent, 1.2 g of tetrahydrofuran as a vinyl control agent ((1) in Table 1), 1.76 g (27.4 mmol) of n-butyl lithium as a polymerization initiator, and 750 g of 1,3-butadiene as a monomer ((1) in Table 1) were introduced and subjected to adiabatic polymerization under a condition of polymerization initiation temperature 50° C., thereby obtaining a conjugated diene polymer. After confirming that a polymerization conversion rate had reached 100%, a small amount of polymerization reaction liquid was extracted from the reaction container and poured into methanol, and a 1,2-vinyl bond content in the conjugated diene polymer was measured to be 15% by mol.

Thereafter, 1,750 g of 1,3-butadiene ((2) in Table 1) and 35 g of tetrahydrofuran as a vinyl control agent ((2) in Table 1) were further added to polymerize, thereby obtaining a conjugated diene polymer.

Thereafter, 27.4 mmol of N,N-bis(trimethylsilyl)aminopropylmethyldiethoxysilane (BTADS) as a denaturant (m) was added into the reaction container and allowed to react for 30 minutes. Then, hydrogenation reaction was carried out by a method similar to that of Synthesis Example 1, thereby obtaining a rubbery hydrogenated conjugated diene polymer (hereinafter, also referred to as "polymer (A-17)").

Synthesis Example 18

Synthesis of Polymer (a-1)

Into a nitrogen-flushed reaction container of inner volume 5 L, 2,000 g of water, 45 g of rosin acid soap, 960 g of butadiene, 40 g of diethylaminoethyl methacrylate, and 3.5 g of t-dodecyl mercaptan were introduced, temperature of the polymerization container was set to 5° C., and 1 g of p-menthane hydroperoxide, 0.7 g of tetrasodium ethylenediaminetetraacetate, 0.5 g of iron(II) sulfate heptahydrate, and 1.5 g of sodium formaldehyde sulfoxylate as radical polymerization initiators were added thereto to allow polymerizing, thereby obtaining an emulsion containing a polymer. The emulsion was subjected repeatedly to coagulation with methanolic hydrogen chloride and dissolution with toluene, and then to vacuum drying 60° C. Next, a rubbery hydrogenated conjugated diene polymer (hereinafter, also referred to as "polymer (a-1)") was obtained through hydrogenation similarly to Synthesis Example 1.

Synthesis Example 19

Synthesis of Polymer (a-2)

A hydrogenated conjugated diene polymer (hereinafter, also referred to as "polymer (a-2)") was obtained by a method similar to that of Synthesis Example 1, except that end denaturation by BTADS was not carried out, hydrogen gas was supplied to the reaction container at a pressure of 0.4 MPa (gauge pressure), and after stirring for 20 minutes, lithium at an end of conjugated diene polymer was reacted with hydrogen.

Synthesis Example 20

Synthesis of Polymer (a-3)

A rubbery hydrogenated conjugated diene polymer (hereinafter, also referred to as "polymer (a-3)") was obtained by a method similar to that of Synthesis Example 19, except that the target hydrogenation rate was 50% by mol.

Synthesis Example 21

Synthesis of Polymer (a-4)

A rubbery hydrogenated conjugated diene polymer (hereinafter, also referred to as "polymer (a-4)") was obtained by a method similar to that of Synthesis Example 1, except that the amount of tetrahydrofuran introduced as a vinyl control agent was changed from 50 g to 5 g.

The polymerization initiators, vinyl control agents, monomers, and denaturants used as raw materials of polymers (A) in Synthesis Examples 1 to 21 are shown in Table 1 below. Here, "-" in Table 1 means no component. In addition, the resulting polymers from (A-1) to (A-17) and polymers from (a-1) to (a-4) are each shown in Table 1 with respect to measured values of 1,2-vinyl bond content, content of the functional group (f), weight average molecular weight (Mw), molecular weight distribution (Mw/Mn), hydrogenation rate, and a solubility in cyclohexane at 25° C. and 1 atom.

TABLE 1

|  |  |  | Synthesis Example 1 | Synthesis Example 2 | Synthesis Example 3 | Synthesis Example 4 | Synthesis Example 5 | Synthesis Example 6 |
|---|---|---|---|---|---|---|---|---|
| Raw material of polymer (used amount) | polymerization initiator (mmol) | n-butyl lithium | 27.4 | 27.4 | 27.4 | 27.4 | 27.4 | 27.4 |
|  |  | piperidine | — | — | — | — | — | 21.2 |
|  | vinyl control agent (g) | tetrahydrofuran | 50 | 25 | 200 | 50 | 75 | 50 |
|  | monomer (g) | 1,3-butadiene | 2,500 | 2,500 | 2,500 | 2,500 | 1,900 | 2,500 |
|  |  | styrene | — | — | — | — | 600 | — |
|  |  | diethylaminoethyl methacrylate | — | — | — | — | — | — |
|  | denaturant (m) (mmol) | BTADS | 27.4 | 27.4 | 27.4 | 27.4 | 27.4 | — |
|  |  | GPMOS | — | — | — | — | — | — |
|  |  | ethylene glycol diglycidyl ether | — | — | — | — | — | — |
|  |  | 4,4'-dimethylamino benzophenone | — | — | — | — | — | — |
|  |  | tetraethoxy-silane | — | — | — | — | — | — |
|  |  | ethylene oxide | — | — | — | — | — | — |

TABLE 1-continued

|  |  |  | | | | | | |
|---|---|---|---|---|---|---|---|---|
|  |  | carbon dioxide | — | — | — | — | — | — |
|  |  | bisphenol A diglycidyl ether | — | — | — | — | — | — |
|  |  | silicon tetrachloride | — | — | — | — | — | — |
|  |  | dimethyl dichlorosilane | — | — | — | — | — | — |
| Polymer | type | | A-1 | A-2 | A-3 | A-4 | A-5 | A-6 |
|  | 1,2-vinyl bond content (mol %) | | 42 | 33 | 65 | 41 | 40 | 42 |
|  | content of functional group (f) (mol/kg) | | 0.0178 | 0.0182 | 0.0168 | 0.0176 | 0.0166 | 0.0078 |
|  | weight average molecular weight | | 286,000 | 277,000 | 284,000 | 287,000 | 254,000 | 280,000 |
|  | molecular weight distribution (Mw/Mn ratio) | | 1.2 | 1.2 | 1.2 | 1.2 | 1.2 | 1.1 |
|  | hydrogenation rate (mol %) | | 96 | 97 | 94 | 67 | 97 | 98 |
|  | solubility in cyclohexane at 25° C. and 1 atom (g/100 g) | | 19 | 18 | 19 | 19 | 19 | 17 |

|  |  |  | Synthesis Example 7 | Synthesis Example 8 | Synthesis Example 9 | Synthesis Example 10 | Synthesis Example 11 | Synthesis Example 12 |
|---|---|---|---|---|---|---|---|---|
| Raw material of polymer (used amount) | polymerization initiator (mmol) | n-butyl lithium | 27.4 | 27.4 | 27.4 | 27.4 | 27.4 | 27.4 |
|  |  | piperidine | 21.2 | — | — | — | — | — |
|  | vinyl control agent (g) | tetrahydrofuran | 50 | 50 | 50 | 50 | 50 | 50 |
|  | monomer (g) | 1,3-butadiene | 2,500 | 2,500 | 2,500 | 2,500 | 2,500 | 2,500 |
|  |  | styrene | — | — | — | — | — | — |
|  |  | diethylaminoethyl methacrylate | — | — | — | — | — | — |
|  | denaturant (m) (mmol) | BTADS | 28.3 | — | — | — | — | — |
|  |  | GPMOS | — | 27.4 | — | — | — | — |
|  |  | ethylene glycol diglycidyl ether | — | — | 27.4 | — | — | — |
|  |  | 4,4'-dimethylamino benzophenone | — | — | — | 27.4 | — | — |
|  |  | tetraethoxy-silane | — | — | — | — | 9.1 | — |
|  |  | ethylene oxide | — | — | — | — | — | 27.4 |
|  |  | carbon dioxide | — | — | — | — | — | — |
|  |  | bisphenol A diglycidyl ether | — | — | — | — | — | — |
|  |  | silicon tetrachloride | — | — | — | — | — | — |
|  |  | dimethyl dichlorosilane | — | — | — | — | — | — |
| Polymer | type | | A-7 | A-8 | A-9 | A-10 | A-11 | A-12 |
|  | 1,2-vinyl bond content (mol %) | | 41 | 46 | 44 | 42 | 43 | 43 |
|  | content of functional group (f) (mol/kg) | | 0.0256 | 0.0218 | 0.0172 | 0.0212 | 0.0092 | 0.0079 |
|  | weight average molecular weight | | 281,000 | 451,000 | 261,000 | 288,000 | 521,000 | 287,000 |
|  | molecular weight distribution (Mw/Mn ratio) | | 1.2 | 1.6 | 1.5 | 1.1 | 1.7 | 2.4 |
|  | hydrogenation rate (mol %) | | 99 | 98 | 97 | 98 | 95 | 94 |
|  | solubility in cyclohexane at 25° C. and 1 atom (g/100 g) | | 18 | 18 | 18 | 19 | 18 | 18 |

|  |  |  | Synthesis Example 13 | Synthesis Example 14 | Synthesis Example 15 | Synthesis Example 16 | Synthesis Example 17 | Synthesis Example 18 |
|---|---|---|---|---|---|---|---|---|
| Raw material of polymer (used amount) | polymerization initiator (mmol) | n-butyl lithium | 27.4 | 27.4 | 27.4 | 27.4 | 27.4 | — |
|  |  | piperidine | 27.4 | 21.2 | 21.2 | 21.2 | — | — |
|  | vinyl control agent (g) | tetrahydrofuran | 50 | 50 | 50 | 50 | (1)1.2 (2)35 | — |
|  | monomer (g) | 1,3-butadiene | 2,500 | 2,500 | 2,500 | 2,500 | (1)750 (2)1,750 | 960 |
|  |  | styrene | — | — | — | — | — | — |
|  |  | diethylaminoethyl methacrylate | — | — | — | — | — | 40 |
|  | denaturant (m) (mmol) | BTADS | — | — | — | — | 27.4 | — |
|  |  | GPMOS | — | — | — | — | — | — |
|  |  | ethylene glycol diglycidyl ether | — | — | — | — | — | — |
|  |  | 4,4'-dimethylamino benzophenone | — | — | — | — | — | — |
|  |  | tetraethoxy-silane | — | — | — | — | — | — |

TABLE 1-continued

|  |  |  |  |  |  |  |  |  |
|---|---|---|---|---|---|---|---|---|
|  |  | ethylene oxide | — | — | — | — | — | — |
|  |  | carbon dioxide | blowing | — | — | — | — | — |
|  |  | bisphenol A diglycidyl ether | — | — | — | 13.8 | — | — |
|  |  | silicon tetrachloride | — | 5 | — | — | — | — |
|  |  | dimethyl dichlorosilane | — | — | 18.4 | — | — | — |
| Polymer | type |  | A-13 | A-14 | A-15 | A-16 | A-17 | a-1 |
|  | 1,2-vinyl bond content (mol %) |  | 41 | 42 | 42 | 42 | 28 | 17 |
|  | content of functional group (f) (mol/kg) |  | 0.0075 | 0.0180 | 0.0183 | 0.0181 | 0.0172 | 0.213 |
|  | weight average molecular weight |  | 293,000 | 531,000 | 232,000 | 439,000 | 292,000 | 560,000 |
|  | molecular weight distribution (Mw/Mn ratio) |  | 2.7 | 2.5 | 2.1 | 1.8 | 1.3 | 4.2 |
|  | hydrogenation rate (mol %) |  | 97 | 96 | 95 | 95 | 97 | 85 |
|  | solubility in cyclohexane at 25° C. and 1 atom (g/100 g) |  | 11 | 17 | 19 | 18 | 15 | 2 |

|  |  |  | Synthesis Example 19 | Synthesis Example 20 | Synthesis Example 21 |
|---|---|---|---|---|---|
| Raw material of polymer (used amount) | polymerization initiator (mmol) | n-butyl lithium | 27.4 | 27.4 | 27.4 |
|  |  | piperidine | — | — | — |
|  | vinyl control agent (g) | tetrahydrofuran | 50 | 50 | 5 |
|  | monomer (g) | 1,3-butadiene | 2,500 | 2,500 | 2,500 |
|  |  | styrene | — | — | — |
|  |  | diethylaminoethyl methacrylate | — | — | — |
|  | denaturant (m) (mmol) | BTADS | — | — | 27.4 |
|  |  | GPMOS | — | — | — |
|  |  | ethylene glycol diglycidyl ether | — | — | — |
|  |  | 4,4'-dimethylamino benzophenone | — | — | — |
|  |  | tetraethoxy-silane | — | — | — |
|  |  | ethylene oxide | — | — | — |
|  |  | carbon dioxide | — | — | — |
|  |  | bisphenol A diglycidyl ether | — | — | — |
|  |  | silicon tetrachloride | — | — | — |
|  |  | dimethyl dichlorosilane | — | — | — |
| Polymer | type |  | a-2 | a-3 | a-4 |
|  | 1,2-vinyl bond content (mol %) |  | 43 | 42 | 16 |
|  | content of functional group (f) (mol/kg) |  | 0 | 0 | 0.017 |
|  | weight average molecular weight |  | 281,000 | 291,000 | 286,000 |
|  | molecular weight distribution (Mw/Mn ratio) |  | 1.1 | 1.1 | 1.2 |
|  | hydrogenation rate (mol %) |  | 94 | 51 | 95 |
|  | solubility in cyclohexane at 25° C. and 1 atom (g/100 g) |  | 19 | 18 | 1 |

Preparation of Binder Composition (B) for Batteries

Example 1

100 parts by mass of the polymer (A-1) was dissolved in 40 parts by mass of toluene as the liquid medium (B), thereby obtaining a binder composition of batteries (B-1) of Example 1.

Examples 2 to 17 and Comparative Examples 1 to 4

Binder compositions of batteries of Examples and Comparative Examples were obtained similarly to Example 1 except that polymers for the component (A) shown in Table 2 were each used.

Preparation of Slurry for Battery Electrodes (S)

Example 18

LiCoO$_2$ as an electrode active material for positive electrodes was mixed with the binder composition of batteries (B-1) prepared in Example 1 in an amount of 49 parts by mass with respect to 1 part by mass of the polymer (A) in the composition (B-1) and the mixture was sufficiently kneaded into slurry-like, thereby obtaining a slurry for battery electrodes (S-1) of Example 18.

Examples 19 to 34 and Comparative Examples 5 to 8

Slurries for battery electrodes of Examples and Comparative Examples were obtained similarly to Example 18 except that binder compositions for batteries shown in Table 2 were each used.

Fabrication of Electrode (E)

Example 35

The slurry for battery electrodes (S-1) prepared in Example 18 was coated on an aluminum foil by a doctor blade process and dried for 3 hours by evaporating toluene at 100° C. under reduced pressure, thereby fabricating an electrode (E-1) where an electrode of thickness 0.1 mm was formed on the aluminum foil.

Examples 36 to 51 and Comparative Examples 9 to 12

Electrodes of Examples and Comparative Examples were fabricated similarly to Example 35 except that the slurries shown in Table 2 were each used.

Evaluations

Workability

Workability during a step of forming an electrode layer in the resulting electrodes (E) was evaluated in accordance with the following criteria:

A: formation of a uniform coating over an entire surface of aluminum foil being visually confirmed;

B: presence of an uncovered part by coating being visually confirmed on the surface of aluminum foil; and C: difficulty in coating being found.

Peel Strength

With respect to the resulting electrodes (E), a tape of width 20 mm was adhered to an electrode layer and the tape was pulled away in a condition of peeling angle 90° and peeling speed 50 mm/min, then a peel strength was measured when the electrode layer was peeled from the aluminum foil.

The resulting evaluation results of the workability and the peel strength are shown in Table 2 below. Here, "-" in Table 2 means no measurement.

material of positive electrodes and $0.01Li_3PO_4$-$0.63Li_2S$-$0.36SiS_2$ of a lithium ion conductive inorganic solid electrolyte material as a solid electrolyte material and sufficiently kneading the mixture into slurry-like. The amounts of $0.01Li_3PO_4$-$0.63Li_2S$-$0.36SiS_2$ and $LiCoO_2$ were adjusted such that a mass ratio of the polymer (A) in the binder composition for batteries (B-1), $0.01Li_3PO_4$-$0.63Li_2S$-$0.36SiS_2$, and $LiCoO_2$ is 2/32/66.

TABLE 2

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| (A) Component | A-1 | A-2 | A-3 | A-4 | A-5 | A-6 | A-7 | A-8 | A-9 | A-10 | A-11 | A-12 |
| Binder composition for batteries | B-1 | B-2 | B-3 | B-4 | B-5 | B-6 | B-7 | B-8 | B-9 | B-10 | B-11 | B-12 |

|  | Example 13 | Example 14 | Example 15 | Example 16 | Example 17 | Comparative Example 1 | Comparative Example 2 | Comparative Example 3 | Comparative Example 4 |
|---|---|---|---|---|---|---|---|---|---|
| (A) Component | A-13 | A-14 | A-15 | A-16 | A-17 | a-1 | a-2 | a-3 | a-4 |
| Binder composition for batteries | B-13 | B-14 | B-15 | B-16 | B-17 | b-1 | b-2 | b-3 | b-4 |

|  | Example 18 | Example 19 | Example 20 | Example 21 | Example 22 | Example 23 | Example 24 | Example 25 | Example 26 | Example 27 | Example 28 | Example 29 |
|---|---|---|---|---|---|---|---|---|---|---|---|---|
| (s) Slurry for battery electrodes | S-1 | S-2 | S-3 | S-4 | S-5 | S-6 | S-7 | S-8 | S-9 | S-10 | S-11 | S-12 |

|  | Example 30 | Example 31 | Example 32 | Example 33 | Example 34 | Comparative Example 5 | Comparative Example 6 | Comparative Example 7 | Comparative Example 8 |
|---|---|---|---|---|---|---|---|---|---|
| (s) Slurry for battery electrodes | S-13 | S-14 | S-15 | S-16 | S-17 | s-1 | s-2 | s-3 | s-4 |

|  | Example 35 | Example 36 | Example 37 | Example 38 | Example 39 | Example 40 | Example 41 | Example 42 | Example 43 | Example 44 | Example 45 | Example 46 |
|---|---|---|---|---|---|---|---|---|---|---|---|---|
| (E) Electrode | E-1 | E-2 | E-3 | E-4 | E-5 | E-6 | E-7 | E-8 | E-9 | E-10 | E-11 | E-12 |
| Workability | A | A | A | A | A | A | A | A | A | A | A | A |
| Peel strength (g/cm) | 175 | 95 | 101 | 83 | 79 | 81 | 213 | 136 | 101 | 89 | 99 | 79 |

|  | Example 47 | Example 48 | Example 49 | Example 50 | Example 51 | Comparative Example 9 | Comparative Example 10 | Comparative Example 11 | Comparative Example 12 |
|---|---|---|---|---|---|---|---|---|---|
| (E) Electrode | E-13 | E-14 | E-15 | E-16 | E-17 | e-1 | e-2 | e-3 | e-4 |
| Workability | A | A | A | A | A | C | A | A | C |
| Peel strength (g/cm) | 123 | 255 | 222 | 231 | 181 | — | 50 | 20 | — |

Preparation of Slurry for Battery Electrodes (T) Containing Solid Electrolyte Material Example 52

A slurry for battery electrodes (T-1) was obtained by adding and mixing the binder composition for batteries (B-1) prepared in Example 1 with $LiCoO_2$ as an electrode active Examples 53 to 68 and Comparative Examples 13 to 16

Slurries for battery electrodes of Examples and Comparative Examples were obtained similarly to Example 52 except that the binder compositions for batteries shown in Table 3 were each used.

Fabrication of Electrode (F)

Example 69

The slurry for battery electrodes (T-1) prepared in Example 52 was coated on an aluminum foil by a doctor blade process and dried for 3 hours by evaporating toluene at 100° C. under reduced pressure, thereby fabricating an electrode (F-1) where an electrode layer of thickness 0.1 mm was formed on the aluminum foil.

Examples 70 to 85 and Comparative Examples 17 to 20

Slurries for battery electrodes of Examples and Comparative Examples were obtained similarly to Example 69 except that the slurries for battery electrodes binder compositions for batteries shown in Table 3 were each used.
Evaluations>
Workability
Workability during a step of forming an electrode layer in the resulting electrodes (F) was evaluated in accordance with the method and the criteria described above.
Peel Strength
With respect to the resulting electrodes (F), a tape of width 20 mm was adhered to an electrode layer and the tape was pulled away in a condition of peeling angle 90° and peeling speed 50 mm/min, then a peel strength was measured when the electrode was peeled from the aluminum foil.
Electric Characteristics of Electrode Layer
An electrode layer was formed on a fluorine resin plate by coating the slurries for battery electrodes (T) on the fluorine resin plate in place of the aluminum foil using the method the same as that of fabricating the resulting electrodes (F). The electrode layer formed on the fluorine resin plate was peeled from the fluorine resin plate and cut out into a size of diameter 10 mm, thereby obtaining an electrode layer-molded body (G).

Electric characteristics were confirmed by an AC impedance method with respect to the electrode layer-molded bodies (G) resulting from the respective slurries for battery electrodes (T).

Specifically, using a measuring device 1 equipped with a cylindrical sample holder 2 made of polyethylene terephthalate as shown in FIG. 1, an electrode layer-molded body (G) 3, a solid electrolyte layer 7 formed from the same lithium ion conductive solid electrolyte material as that used for fabricating the electrode layer-molded body (G) 3, and a metal lithium foil 6 are laminated in this order within the cylindrical sample holder 2; a lead terminal 4 is press-contacted with the electrode layer-molded body (G) 3 and a lead terminal 5 is press-contacted with the metal lithium foil 6, thereby obtaining a measuring cell where the electrode layer-molded body (G) 3, the solid electrolyte layer 7, and the metal lithium foil 6 are integrally molded; then AC impedance was measured within a frequency range of from 100 kHz to 1 MHz by applying an AC voltage of 10 mV on the measuring cell from an impedance analyzer using the electrode layer-molded body (G) 3 as a test pole and the metal lithium foil 6 as a counter electrode.

The evaluation results of the workability, the peel strength, and electric characteristics obtained are shown in Table 3 below. Here, "-" in Table 3 means no measurement.

TABLE 3

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| (A) Component | A-1 | A-2 | A-3 | A-4 | A-5 | A-6 | A-7 | A-8 | A-9 | A-10 | A-11 | A-12 |
| Binder composition for batteries | B-1 | B-2 | B-3 | B-4 | B-5 | B-6 | B-7 | B-8 | B-9 | B-10 | B-11 | B-12 |

| | Example 13 | Example 14 | Example 15 | Example 16 | Example 17 | Comparative Example 1 | Comparative Example 2 | Comparative Example 3 | Comparative Example 4 |
|---|---|---|---|---|---|---|---|---|---|
| (A) Component | A-13 | A-14 | A-15 | A-16 | A-17 | a-1 | a-2 | a-3 | a-4 |
| Binder composition for batteries | B-13 | B-14 | B-15 | B-16 | B-17 | b-1 | b-2 | b-3 | b-4 |

| | Example 52 | Example 53 | Example 54 | Example 55 | Example 56 | Example 57 | Example 58 | Example 59 | Example 60 | Example 61 | Example 62 | Example 63 |
|---|---|---|---|---|---|---|---|---|---|---|---|---|
| (s) Slurry for battery electrodes | T-1 | T-2 | T-3 | T-4 | T-5 | T-6 | T-7 | T-8 | T-9 | T-10 | T-11 | T-12 |

| | Example 64 | Example 65 | Example 66 | Example 67 | Example 68 | Comparative Example 13 | Comparative Example 14 | Comparative Example 16 | Comparative Example 16 |
|---|---|---|---|---|---|---|---|---|---|
| (s) Slurry for battery electrodes | T-13 | T-14 | T-15 | T-16 | T-17 | t-1 | t-2 | t-3 | t-4 |

| | Example 69 | Example 70 | Example 71 | Example 72 | Example 73 | Example 74 | Example 75 | Example 76 | Example 77 | Example 78 | Example 79 | Example 80 |
|---|---|---|---|---|---|---|---|---|---|---|---|---|
| (E) Electrode | F-1 | F-2 | F-3 | F-4 | F-5 | F-6 | F-7 | F-8 | F-9 | F-10 | F-11 | F-12 |
| Workability | A | A | A | A | A | A | A | A | A | A | A | A |
| Peel strength (g/cm) | 185 | 105 | 130 | 87 | 99 | 89 | 252 | 143 | 102 | 91 | 102 | 83 |

TABLE 3-continued

| Internal impedance (Ω) | 30 | 45 | 39 | 56 | 49 | 52 | 21 | 35 | 44 | 55 | 48 | 57 |

| | Example 81 | Example 82 | Example 83 | Example 84 | Example 85 | Comparative Example 17 | Comparative Example 18 | Comparative Example 19 | Comparative Example 20 |
|---|---|---|---|---|---|---|---|---|---|
| (E) Electrode | F-13 | F-14 | F-15 | F-16 | F-17 | f-1 | f-2 | f-3 | f-4 |
| Workability | A | A | A | A | A | C | A | B | C |
| Peel strength (g/cm) | 128 | 284 | 261 | 265 | 188 | — | 38 | 14 | — |
| Internal impedance (Ω) | 41 | 26 | 29 | 32 | 32 | — | 126 | 340 | — |

It is demonstrated from the results shown in Tables 2 and 3 that the slurry for battery electrodes obtained from the binder composition for batteries of the embodiment of the present invention is excellent in workability when fabricating electrodes and also excellent in adhesion between electrode layers containing the binder and current collectors. It is also demonstrated that electrode layers containing the binder, electrode active materials, and solid electrolyte materials have high adhesion as well as excellent electric characteristics.

EXPLANATION OF THE REFERENCE SYMBOLS

1: measuring device for electrochemical characteristics
2: cylindrical sample holder
3: electrode layer-molded body
4, 5: lead terminals
6: metal lithium foil
7: solid electrolyte layer

INDUSTRIAL APPLICABILITY

The binder composition for batteries of the embodiment of the present invention allows to improve workability in forming electrode layers and also to form a binder excellent in adhesion to solid electrolyte materials and current collectors along with suppressing effects on electrode active materials and solid electrolyte materials.

The invention claimed is:

1. A binder composition for batteries, comprising:
(A) a polymer that comprises at least one structural unit selected from structural units represented by formulae (a1) to (a5), and (f) a functional group comprising a nitrogen atom, an oxygen atom, a silicon atom, a germanium atom, a tin atom or a combination thereof; and
(B) a liquid medium,
the polymer (A) having a solubility of no less than 5 g in 100 g of cyclohexane at 25° C. and 1 atm,

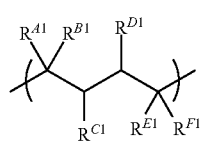
(a1)

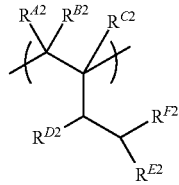
(a2)

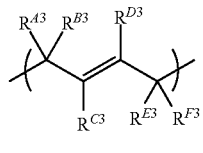
(a3)

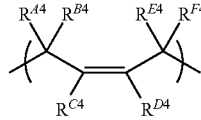
(a4)

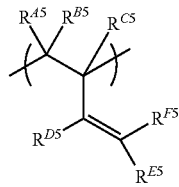
(a5)

wherein, in the formulae (a1) to (a5), $R^{A1}$ to $R^{F5}$ are each independently a hydrogen atom or a monovalent aliphatic hydrocarbon group having 1 to 18 carbon atoms,
wherein the polymer (A) comprises at least one structural unit selected from the structural units represented by the formulae (a1) and (a2), and a total content of the structural units represented by the formulae (a1) and (a2) is no less than 60% by mol with respect to a total content of the structural units represented by the formulae (a1) to (a5).

2. The binder composition according to claim 1, wherein the polymer (A) is obtained by reacting an active end of a polymer comprising at least one structural unit selected from the structural units represented by the formulae (a1) to (a5), with (m) a denaturant comprising a nitrogen atom, an oxygen atom, a silicon atom, a germanium atom, a tin atom or a combination thereof to form a bond.

3. The binder composition according to claim 2, wherein the denaturant (m) is represented by formula (x):

$$R^1_{4-n1}MX^1_{n1}$$ (x)

wherein, in the formula (x), $R^1$ is a hydrogen atom or a monovalent hydrocarbon group; M is a silicon atom, a germanium atom, or a tin atom; $X^1$ is a halogen atom or an alkoxy group; n1 is an integer of from 2 to 4; and wherein, in a case in which $R^1$ is present in a plurality of number, the plurality of $R^1$s are each identical or different, and in a case in which $X^1$ is present in a plurality of number, the plurality of $X^1$s are each identical or different.

4. The binder composition according to claim 1, wherein the polymer (A) is represented by formula (P):

$$L_aMY_{4-a} \qquad (P)$$

wherein, in the formula (P), L is a polymer chain comprising at least one structural unit selected from structural units represented by the formulae (a1) to (a5); M is a silicon atom, a germanium atom, or a tin atom; Y is a hydrogen atom, a monovalent hydrocarbon group, a halogen atom, or an alkoxy group; a is an integer of from 2 to 4; and wherein, in a case in which L is present in a plurality of number, the plurality of Ls are each identical or different, and in a case in which Y is present in a plurality of number, the plurality of Ys are each identical or different.

5. The binder composition according to claim 1, wherein a content of the functional group (f) in the polymer (A) is no less than 0.0005 mol/kg and no greater than 0.2 mol/kg.

6. The binder composition according to claim 1, wherein the functional group (f) is an amino group, a hydroxyl group, a carboxyl group, an alkoxysilyl group or a combination thereof.

7. The binder composition according to claim 1, wherein a ratio of a weight average molecular weight to a number average molecular weight of the polymer (A) is no greater than 3.

8. The binder composition according to claim 1, wherein the polymer (A) is obtained by living anionic polymerization.

9. The binder composition according to claim 1, wherein the liquid medium (B) is a nonpolar organic liquid medium.

10. A slurry for battery electrodes, comprising:
an electrode active material; and
the binder composition according to claim 1.

11. A solid electrolyte composition, comprising:
a solid electrolyte material; and
the binder composition according to claim 1.

12. An electrode, comprising:
a current collector and an electrode layer laminated on at least a part of the current collector,
wherein the electrode layer is formed from the slurry according to claim 10.

13. An all-solid-state battery, comprising:
a pair of electrodes which are disposed such that the electrode layers are opposed, wherein each of the pair of electrodes is the electrode according to claim 12; and
a solid electrolyte layer disposed between the pair of electrodes.

* * * * *